(12) United States Patent
Cantz et al.

(10) Patent No.: US 10,902,977 B2
(45) Date of Patent: Jan. 26, 2021

(54) CABLE ASSEMBLY

(71) Applicant: HUBER+SUHNER AG, Herisau (CH)

(72) Inventors: Thomas Cantz, Stäfa (CH); Reto Casanova, Pfäffikon (CH)

(73) Assignee: HUBER+SUHNER AG, Herisau (CH)

( * ) Notice: Subject to any disclaimer, the term of this patent is extended or adjusted under 35 U.S.C. 154(b) by 244 days.

(21) Appl. No.: 16/074,124

(22) PCT Filed: Jan. 18, 2017

(86) PCT No.: PCT/EP2017/050981
§ 371 (c)(1),
(2) Date: Jul. 31, 2018

(87) PCT Pub. No.: WO2017/133893
PCT Pub. Date: Aug. 10, 2017

(65) Prior Publication Data
US 2020/0303093 A1 Sep. 24, 2020

(30) Foreign Application Priority Data

Feb. 1, 2016 (CH) ........................................ 0128/16
May 17, 2016 (CH) ........................................ 0633/16
Oct. 11, 2016 (CH) ........................................ 1359/16

(51) Int. Cl.
*H01B 7/42* (2006.01)
*H01R 13/00* (2006.01)
(Continued)

(52) U.S. Cl.
CPC ........... *H01B 7/423* (2013.01); *H01R 13/005* (2013.01); *H01R 13/506* (2013.01); *B60L 53/16* (2019.02);
(Continued)

(58) Field of Classification Search
CPC ....... H01B 7/423; H01B 9/001; H01R 13/005
See application file for complete search history.

(56) References Cited

U.S. PATENT DOCUMENTS 2,175,749 A * 10/1939 Eckman ................. H01B 9/001
174/19
2,835,721 A * 5/1958 Leathers ................ H01B 9/001
174/15.7
(Continued)

FOREIGN PATENT DOCUMENTS

CN 201984886 U 9/2011
DE 34 20 822 10/1985
(Continued)

OTHER PUBLICATIONS

International Search Report and Written Opinion for International Application No. PCT/EP2017/050981 dated May 23, 2017, 17 pages.

*Primary Examiner* — Ross N Gushi
(74) *Attorney, Agent, or Firm* — McDonnell Boehnen Hulbert Berghoff LLP

(57) ABSTRACT

The invention is directed to a cable assembly (10, 10a-b), comprising a cable (10, 10a-b) with a cable hose (11, 11a-b) and at least one conductor (12, 12a-f) arranged therein. The cable hose (11, 11a-b) is spaced a distance apart from the conductor (12) forming a first interstitial space (15, a-b) between the at least conductor (12) and the cable hose (11, 11a-b). At least one tube (20, 20a-b) for conveying of a cooling fluid (21), and a connector (30) comprising at least one contact member (31) interconnected to the at least one conductor (12) and a chamber (32). Said chamber (32) comprises a first port (33) which is interconnected to the first interstitial space between the at least one conductor (12,
(Continued)

12*a-f*) and the cable hose (11, 11*a-b*) and a second port (34*a*, 34*a-b*) which is interconnected to the at least one tube (20, 20*a-b*).

21 Claims, 14 Drawing Sheets

(51) Int. Cl.
    *H01R 13/506*     (2006.01)
    *B60L 53/302*     (2019.01)
    *B60L 53/16*     (2019.01)
    *B60L 53/18*     (2019.01)
    *H01R 27/00*     (2006.01)

(52) U.S. Cl.
    CPC ............. *B60L 53/18* (2019.02); *B60L 53/302* (2019.02); *H01R 27/00* (2013.01); *H01R 2201/26* (2013.01)

(56) References Cited

U.S. PATENT DOCUMENTS

| | | | | |
|---|---|---|---|---|
| 3,156,760 | A | * | 11/1964 | Grove ..................... H01R 9/11 |
| | | | | 174/15.7 |
| 3,603,715 | A | | 9/1971 | Eilhardt et al. |
| 4,310,718 | A | | 1/1982 | Eng |
| 5,442,131 | A | * | 8/1995 | Borgwarth ............. H01B 7/425 |
| | | | | 165/104.33 |
| 5,684,380 | A | | 11/1997 | Woody et al. |
| 6,063,998 | A | | 5/2000 | Rolf et al. |
| 2013/0029193 | A1 | | 1/2013 | Dyer et al. |

FOREIGN PATENT DOCUMENTS

| | | |
|---|---|---|
| DE | 10 2010 050562 | 4/2012 |
| EP | 0 889 548 | 1/1999 |
| JP | 2000 133058 | 5/2000 |
| JP | 2012 238532 | 12/2012 |

* cited by examiner

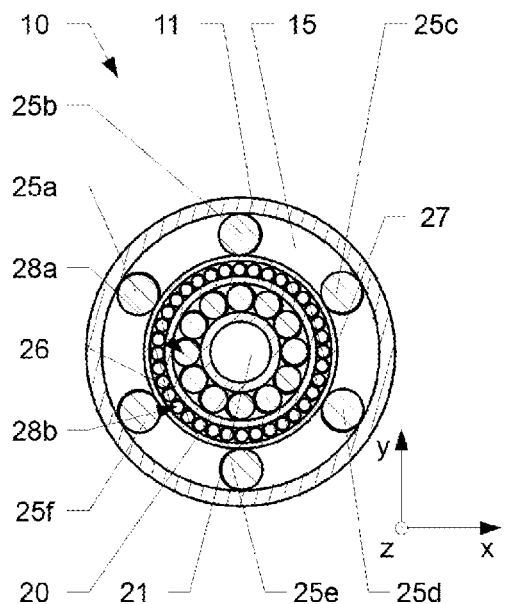
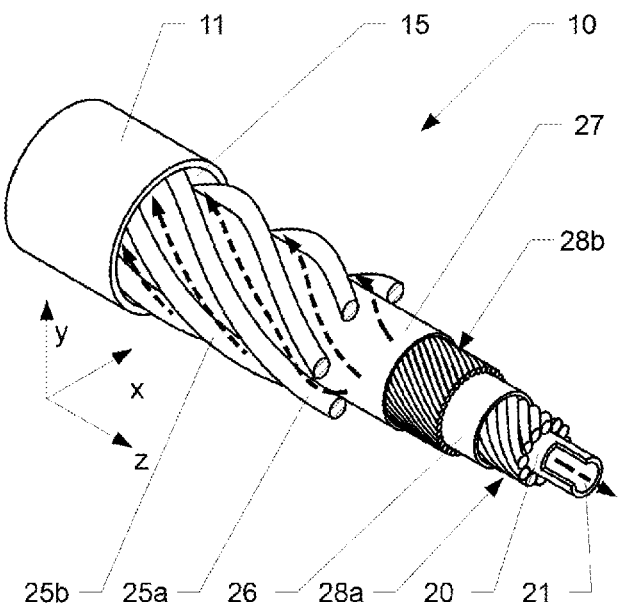
Fig. 7a  Fig. 7b
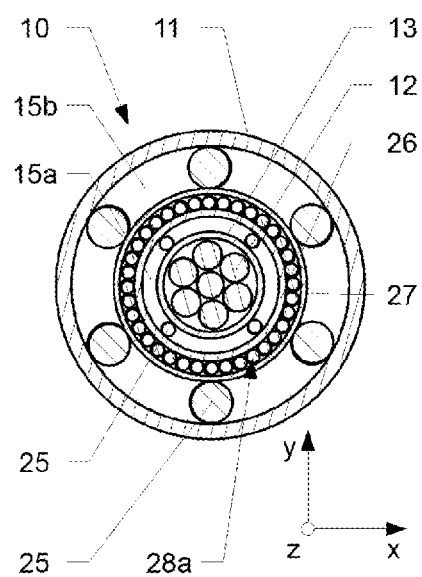
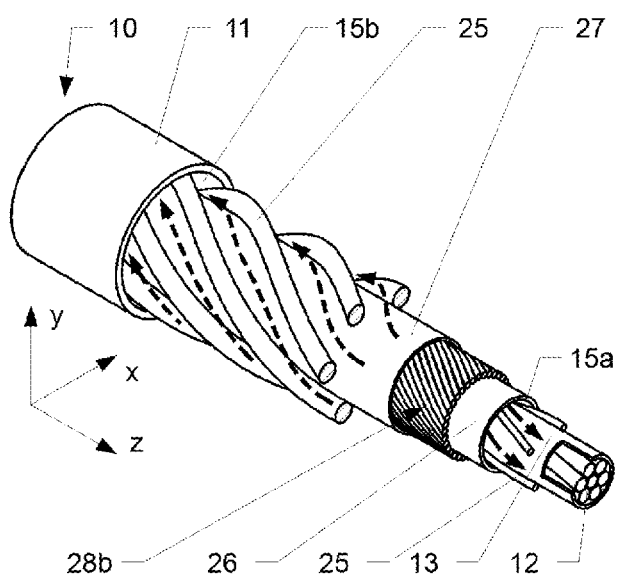
Fig. 8a  Fig. 8b

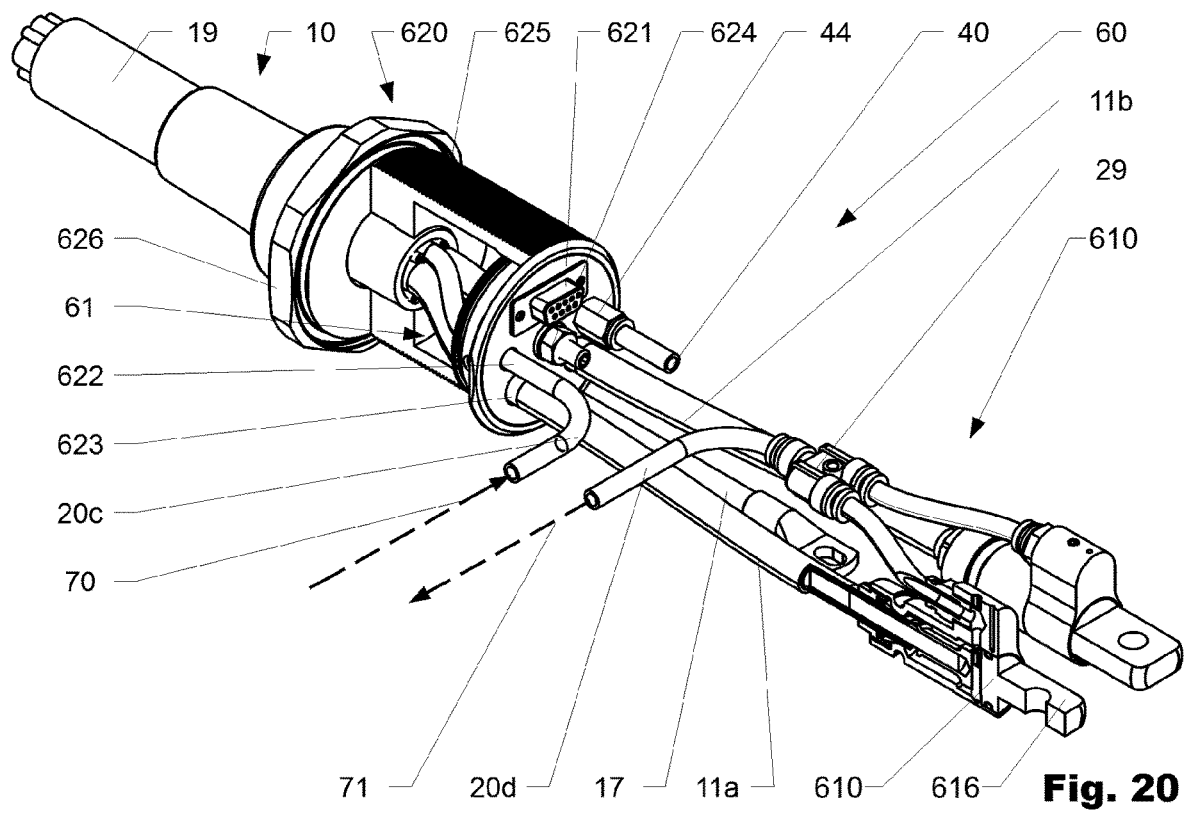
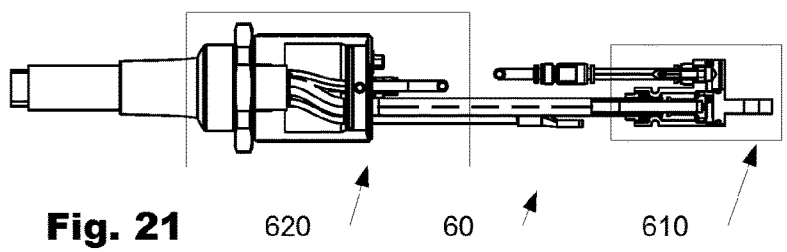
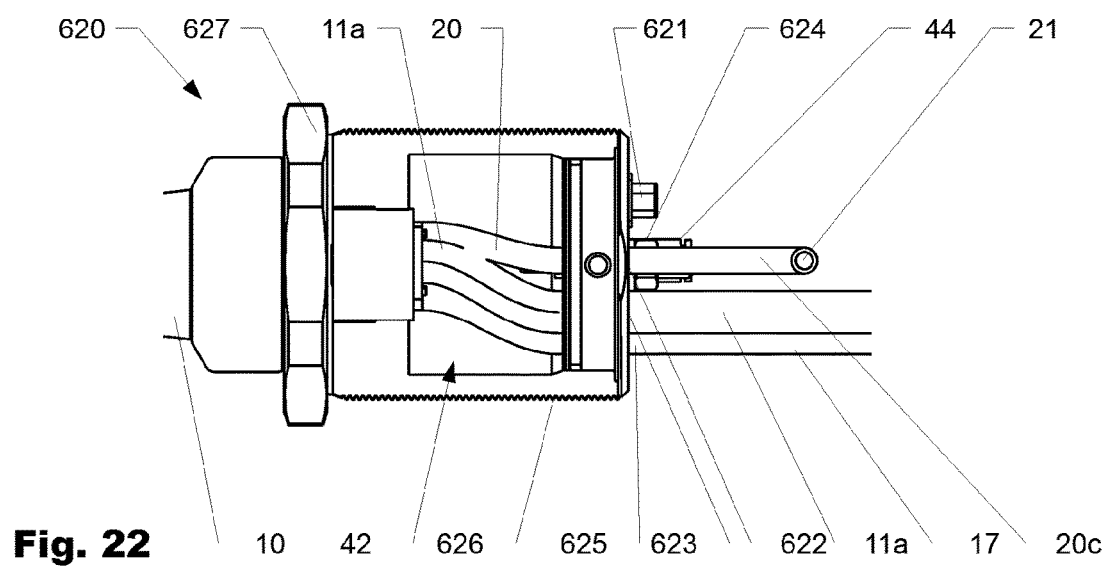

CABLE ASSEMBLY

This application is a national stage application under 35 U.S.C. § 371 of International Application No. PCT/EP2017/050981, filed Jan. 18, 2017, which claims the benefit of priority of Swiss Patent Application No. 00128/16, filed Feb. 1, 2016; Swiss Patent Application No. 00633/16, filed May 17, 2016; and Swiss Patent Application No. 01359/16, filed Oct. 11, 2016.

FIELD OF THE INVENTION

The present invention is directed to a cable assembly, in particular to a cable assembly with a temperature regulating means.

BACKGROUND OF THE INVENTION

A wide range of publications with regard to cable assemblies that comprise temperature regulation means is known. Such cable assemblies are e.g. used for conducting high electrical currents, as for power supply for charging batteries of electrical vehicles. Following Joule's Law of heating, due to the high currents usually occurring in such cable assemblies during operation high amounts of thermal energy may be generated, constituting a risk for the cable assembly as well as for the devices interconnected with it. One way to obtain high currents while keeping joule heating low is to reduce the electrical resistance of the conductor. When using conventional conductors this is typically done by increasing the conductor's diameter and/or trying to keep the conductor at relatively low temperatures, as in general a conductor's electrical resistance increases with increasing temperature.

WO2012/079631 was filed on 15 Dec. 2010 by ABB Technology AG and discloses a high voltage electric cable compromising at least one cable core and at least one cooling pipe. The cable core is surrounded by a heat conducting element and is arranged in thermal contact with at least one cooling pipe. According to an exemplary embodiment this thermal contact can be achieved by applying pressure on the cooling pipes from outside of the electric cable, such that the cooling pipes are pressed against the cable parts. In another embodiment the cross-sections between the cable cores and the cooling pipes are filled with a heat conducting material to ensure sufficient thermal contact. Furthermore, the filler provides a circular shape of the cable and prevent indentations in the cable surface due to empty space between the cable cores and the cooling pipes. The degree of heat exchange which can be obtained with such an arrangement is limited as the contact faces between cable cores and cooling pipes are relatively small. In addition, this presupposes direct contact is needed and cannot be guaranteed if the cable is bent.

GB2350474 was filed on 28 May 1999 on behalf of ABB AB and discloses a power cable which comprises at least two coaxially arranged electrically conducting means. The invention is mainly directed to superconducting power cables, which have to be cooled to low critical temperatures using e.g. liquid helium or nitrogen. The inner conductor is stranded and surrounded by a profiles extruded tubular layer with channels at the inner peripheral surface defining channels for a coolant. A second stranded conductor is placed on the outer peripheral of the cable with a neighboring layer compromising axial channels for a second coolant. Such cables have a relatively complex inner architecture to meet the high demands posed by the special types of cooling agents. Hence they are complicated to manufacture, which has an adverse effect in terms of production costs. Thus, although such cables are reasonable in the field of superconducting systems, they are not really suited for other applications.

CN202887849U was filed on 7 Nov. 2012 on behalf of the Jiangsu Tiancheng Wire and Cable Group Co. Ltd. It discloses a self-cooling power cable that compromises a plurality of cable cores which are arranged around a sealed flexible metal pipe which may be flooded with a cooling medium. A temperature-measuring wire is placed in the metal pipe to measure the temperature of the whole cable. When the temperature within this metal-pipe reaches a pre-set temperature an alarm is sent out and water is injected into the metal-pipe to cool down the cable. Due to the metal pipe the resulting power cable has a very limited flexibility.

WO2015/119791A1 was filed on 23 Jan. 2015 on behalf of Tesla Motors and relates to a charging system for an electric vehicle that includes a charging station, a cable and a cable connector comprising a cooling conduit to reduce charging times and enhance the cable flexibility. The cables comprise a minimum of two conductors with additional cooling conduits. Furthermore, signal cables and ground connectors are present within the cables structure. One embodiment of the cable has a central coolant conduit and multiple radially positioned conduits. The conduits are formed as an integral structure of an extrusion part. At the end of the cable the central coolant conduit and the multiple radially positioned conduits can be coupled. In some implementations, the connector can serve as a turnaround point for coolant that has flowed in one direction inside the charging cable or in other implementations, the coolant may continue through the connector without returning, for example into a coolant reservoir of the vehicle. However, due to the special alignment of the incoming and outgoing portions of the coolant conduit, incoming coolant is heated by outgoing coolant. This decreases the efficiency of the cooling system. As well, the document discloses to use a thermal filler material in order to increase thermal transfer and thus improve cooling. However, such filler material will increase resistance to bending of a cable and hence deteriorate handling of the cable.

U.S. Pat. No. 5,591,937A published in 1997 by General Motors Corp. relates to a transmission cable which is electrically coupled between the power source and the electric vehicle for coupling electrical power to the batteries via an inductive charge port on the vehicle. The transmission cable system incorporates cooling channels that encircles electrical conductors with coolant with a respective cooling system that for storing, cooling, and pumping coolant. A pressure sensitive switch determines the pressure in the cooling system and provides an output signal indicative of a drop in sensed pressure and therefore enables a breach or leak detection. A controller is coupled to the pressure sensitive switch that is responsive to the output signal from the switch for shutting down the inductive charging system in the event of a drop in sensed pressure.

WO15150277 published on the Aug. 1, 2015 by Siemens relates to a cooling device for cooling a cable assembly, containing an outer pipe, which is designed to accommodate the cable assembly in such a way that an intermediate space for accommodating a cooling water layer remains between the outer pipe and the cable assembly. A pressure monitoring device and a pressure controller control the water pressure in the cooling water layer and detect cable damages which cause the water to leak and result in a detectable pressure loss.

SUMMARY OF THE INVENTION

In order to solve at least one of the aforementioned problems, a cable assembly according to the present invention typically comprises a cable hose and at least one conductor arranged therein, wherein the cable hose is spaced a distance apart from the conductor forming a first interstitial space between the at least conductor and the cable hose. Furthermore the cable assembly may comprise at least one tube for conveying of a cooling fluid for cooling of the cable assembly. Alternatively or in addition to at least one tube, the atmosphere may be used for conveying cooling of a fluid for cooling of the cable assembly, hence e.g. a gaseous cooling fluid like air may be taken from the atmosphere or may be drained off to the atmosphere. In addition the cable assembly comprises a connector comprising at least one contact member interconnected to the at least one conductor and a chamber wherein said chamber comprises a first port which is interconnected to the first interstitial space between the cable hose and the at least one conductor and a second port that is interconnected to the tube, respectively to the atmosphere, such that cooling fluid may circulate from the tube, respectively the atmosphere, into the first interstitial space or vice versa. In that the cooling fluid is guided in the first interstitial space along the at least one conductor a very good cooling of the at least one inner conductor is achieved in comparison to a conventional assembly as known from the prior art. Hence, by such a fluid path large-area contact between the cooling fluid and the at least one conductor can be obtained without the need of further contact elements or filler materials. The chamber may be arranged inside the connector or inside the cable. Alternatively, it may also be arranged in an adapter member—such as e.g. a cable terminal means—that connects the cable with the connector.

A cable assembly with a particularly good handling can be obtained, if at least some of the components arranged inside of the cable hose can be displaced in longitudinal direction of the cable with respect to each other. Hence, a cable with a relatively low bending stiffness can be obtained if compared to the cables known from the prior art. Thanks to the special type of fluid path according to the present invention, such relative displacements can easily be obtained without decreasing cooling capacity.

As the first interstitial space is used for cooling fluid, cables and/or connectors with particularly low spatial dimensions, as well as relatively low weight, can be implemented, offering particularly good flexibility and handling even if high electrical currents have to be conducted. As no complex mechanical heat transfer members or fillers are needed, a cable assembly with highly efficient temperature regulation thus can be obtained at relatively low costs.

The invention is not limited to a specific type of conductor. Hence the at least one conductor may e.g. comprise solid wires and/or stranded wires and/or braided wires. As well, different types of conductors with different cross-section may be arranged inside the cable hose. Normally the at least one conductor comprises a first sheath, respectively jacket. Thus certain parts of the at least one conductor may be protected from a cooling fluid, e.g. in order to prevent chemical reactions/corrosion and/or to obtain electrical insulation. For some purposes and in combination with certain cooling fluids, at least one sheath-less conductor can be used, which allows high efficient cooling of said conductor.

For certain applications, an embodiment of a cable according to the invention may comprise a stranded wire that is stranded in a first lay direction and which does not have a first sheath. The embodiment further comprises a spacer wound helically around the stranded wire in a second lay direction opposite to the first lay direction, said spacer being an electrical conductor—such as e.g. a wire or a stranded wire—itself. The spacer may comprise a sheath or may comprise no sheath. Thus, a particularly economic cable may be obtained that is suited for certain applications.

The contact member of the connector may e.g. be a pin and/or a socket and/or an inductive coil/antenna in order to establish contact to a corresponding other connector, respectively device, such as e.g. a charge port of an electric vehicle.

The chamber may e.g. comprise a tube, fluidically interconnecting the first port with the second port. In a preferred embodiment the chamber is part of a cooling system of the connector. If appropriate the chamber is thermally interconnected to the at least one contact member or forms part thereof, as will be explained in more detail below.

Depending on the field of application the cooling fluid may be used in addition or alternatively for heating of the cable assembly respectively components of the cable assembly. This may be appropriate in cold environments, e.g. during winter time at a charging station for vehicles in order to increase the flexibility of the cable and thus improve handling of the cable assembly. The invention further allows to seamlessly switch between cooling mode and heating mode.

Good results are achieved by using a cooling fluid which comprises a liquid. Particularly good results may be obtained if the liquid is selected of the group consisting of oil (in particular mineral oil, vegetable oil, animal oil, silicone, fluorinated oil), water, alcohol (in particular glycol) and liquid gallium. For some applications, the cooling fluid may be an electrically insulating cryogenic fluid. The cooling fluid may also be a material that undergoes a phase transition when being in the cable assembly. Due to the cooling fluid being conveyed in the first interstitial space, also event relatively viscous cooling liquids may be used.

Depending on the field of application the cooling fluid may also comprise a gas such as e.g. air. In particular, the cooling fluid may be dehumidified compressed air. For certain application, the cooling fluid may also comprise an inert gas, e.g. in order to obtain gaseous fire protection and/or to prevent chemical corrosion. For some special applications, the cooling fluid may be an electrically insulating cryogenic gas.

Improved temperature regulation may be obtained if at least one tube for conveying a cooling fluid is arranged inside of the cable hose, in particular if the at least one tube is at least partially in thermal contact with the at least one conductor and/or the cooling fluid conveyed in the first interstitial space. Hence, by adjusting the at least one tube's alignment with respect to the at least one conductor and/or the first interstitial space and/or by adjusting tube size and volume flow rate of the cooling fluid within the tube and/or by adjusting the thermal conductivity of the at least one tube's wall, a cable assembly with very evenly distributed cooling capacity can be obtained. For some applications, the tube may comprise a wall made from a thermally insulated material. Hence, for some applications, the tube may comprise a wall which is at least partially made from a material with a high thermal conductivity. For some applications, the tube may comprise a conductor suited for the transmission of power and/or information, arranged in the wall or in the internal opening of the tube. Thus, even highly temperature-sensitive conductors can be arranged in the cable, particularly well-protected by the cooling fluid from overheating.

In a preferred embodiment incoming cooling fluid is conveyed in the tube at a higher conveying velocity compared to the first interstitial space where it is conducted at a lower velocity along the conductors. Thus thermal transfer to the cooling fluid inside of the tube can be minimized. In that the tube is arranged outside of the hose the tube is thermally separated from the hose and the therein arranged at least one conductor. In an embodiment, the at least one tube for conveying a cooling fluid may at least partially be arranged outside of the cable hose. In such an embodiment, the at least one tube and the cable hose may be arranged in an outer cable housing. In one embodiment, the tube may also at least partially be arranged inside of the hose, at least along a portion of the cable, as will be explained in more detail below.

To obtain efficient regulation of the temperature of the cable assembly a spacer may be arranged in the first interstitial space of the cable. One aim of the spacer is to avoid collapsing of the first interstitial space inside of the cable hose, in particular if the cable is bent. A further object of the spacer may be to take influence on the flow of the liquid, i.e. to improve heat exchange between at least one cable and the cable hose, e.g. by vortex generation.

For some applications, in order to increase thermal transfer at least in a certain region along the cable, a tube may comprise vortex generating means in order to prevent laminar flow.

The spacer may be used in order to decrease and/or increase flow resistance for the cooling fluid at least in certain portions of the cable. Thus, circulation, respectively distribution, of cooling fluid within the first interstitial space—and consequently thermal transfer between the at least one conductor and cooling fluid—can be controlled.

Good results, respectively heat transfer, can be obtained if the spacer is arranged between the cable hose and the at least one conductor. Thus, good circulation of cooling fluid around many types of conductors can be obtained. A cable assembly with very efficient thermal transfer as well as which is easy to manufacture can be obtained if the spacer is a helix, as will be explained in more detail below.

The spacer may e.g. be helically wound around the at least one conductor or around multiple conductors if present. Thus, very efficient heat transfer may be obtained as well as particularly if multiple conductors and/or tubes and/or other components are present inside of the cable hose—a cable assembly with a structurally very stable cable core can be obtained. As well, manufacturing of the cable core can be simplified.

The spacer may comprise a cord-like structure. The cross-section of the spacer may e.g. be round or out-of-round, such as e.g. oval or angled. Alternatively or in addition, the spacer may comprise a mesh-like structure. In order to increase flux of the cooling fluid, the spacer may have a cross-section that varies in shape and/or in diameter along the cable. Hence the spacer may e.g. be a cord with slubs and/or thin spots. Hence clogging of the first interstitial space may be avoided as well as laminar flow of the cooling fluid in the first interstitial space may be prevented—if desired—in order to increase heat transfer between the cooling fluid and the at least one conductor. For some applications, the spacer may have a reinforced core. As well, the spacer may comprise an electrical conductor (for conducting power and/or information) and/or an optical fiber and/or a temperature sensor. In particular, the spacer may be a ground conductor (protective earthing).

The spacer does not have to be an independent component and hence may at least be partially formed at the cable hose (respectively be part of it) and/or at a first sheath of a conductor. As such, the spacer may comprise e.g. a protrusion, like a rib or a stud. For some application, also a tube may be used as a spacer, such as a tube configured to convey a cooling fluid or another type of fluid, in particular pressurized gas. Good results may be obtained if at least one tube is helically wound around the at least one conductor.

In order to control temperature regulation or for other purposes, the cable assembly may comprise a thermal sensor arranged at least partially inside the cable hose. Good results may be obtained if the thermal sensor is an electrical conductor. As such, e.g. a highly thermo-sensitive electrical conductor may be arranged inside of the cable and extend along the cable in order to detect critical temperature at any location inside of the cable.

For some applications at least one tube to convey a cooling fluid is arranged in the center region of the cable hose and at least two conductors are arranged radially around the at least one tube between the at least one tube and the cable hose.

Good distribution, respectively circulation, of cooling fluid in the first interstitial space may be obtained if a first spacer is wrapped helically in a first lay direction around the bundle formed of the at least two conductors and the at least one tube. In addition, such an arrangement simplifies manufacturing of a cable assembly. Alternatively or in addition, for some types of conductors and/or tubes, at least a second spacer may be wrapped helically around (a single) one of the at least two conductors.

In order to obtain cables with specific mechanical properties—as well as to improve heat exchange—the at least two conductors may be stranded in a second lay direction opposite to the first lay direction around the at least one tube, as will be explained in more detail below. The absolute value of the pitch of the helical arrangement/lay of the conductors may be equal or may be different than the one of the spacer. The pitch of the spacer may be chosen such that a particular volume flow rate of a cooling fluid in the first interstitial space between the conductor and the cable hose is obtained.

Alternatively or in addition, the at least two conductors and the at least on tube may be laid in parallel to each other, hence be straight. Thus, the arrangement of conductors and/or tubes within the cable hose may be varying along the cable length.

In order to obtain a very durable cable assembly, the cable hose may be configured to mechanically support the structure and/or the alignment of the conductor and/or tube arranged within the cable hose (as well as any other components arranged therein). Therefore, the cable hose may e.g. comprise an elastic means, such as a helical spring element integrated in the cable hose in order to provide a certain resilience in radial direction which may be advantageous in order the decrease bending stiffness of a cable—while still maintaining a certain cross-section of the cable hose. A spacer may fulfil or at least support this function.

The cable hose may comprise multiple layers. Thereof, at least one layer may be impermeable for the cooling fluid that is used. For some applications, at least one layer may provide electrical insulation. In order to prevent heat transfer from the environment through the cable hose to the cooling fluid, the cable hose may comprise at least one layer made from a thermal insulating material. Alternatively or in addition, the cable hose may also comprise a layer made from a material with a high thermal conductivity in order to support dissipation of thermal energy through the cable hose and to the environment. In order to provide mechanical protection, at least one layer may comprise a reinforcement.

A cable may also comprise a center conductor, e.g. a stranded wire, arranged in the center of the cable's cross-section and having a first sheath. A first concentric layer of an insulation such as an insulating tube, may be arranged such that it envelops the first sheath. The first sheath and the first concentric layer of insulation may be interposed with first spacers arranged around the center conductor in order to define a first interstitial space between first sheath and first concentric layer of insulation to convey a cooling fluid in a first direction along the cable. At least one layer of multiple conductors may be arranged such that it envelops the first concentric layer of insulation. A second concentric layer of an insulation may be arranged such that it envelops the at least one layer of multiple conductors. Second spacers may be arranged around the second concentric layer of an insulation in order to define an additional interstitial space between the second concentric layer of insulation and the cable hose to convey a cooling fluid in a second direction along the cable. The second direction may be the same direction like the first direction or be opposite to the first direction.

Good results may also be obtained, if a cable comprises multiple layers of multiple conductors concentrically arranged and interposed with concentric layers of insulation—insulating tubes—as well as concentric layers that comprise spacers which define a first interstitial space in which a cooling fluid can be conveyed as will be shown in more detail below. According to another embodiment of the invention, instead of a center conductor, also at least one tube to convey a cooling fluid may be arranged in the center of the cable, as will be shown in more detail below.

Particularly good cooling efficiency may be obtained if the temperature of the cooling fluid conveyed closer to the center of the cable, e.g. in a first interstitial space, is lower than the temperature of the cooling fluid conveyed further away from the center of the cable, e.g. in an additional interstitial space, as will be shown in more detail below.

For some applications—e.g. in order to conduct particularly high electrical currents—the at least one contact member may comprise a channel for cooling of the contact member. The channel may be fluidically interconnected with the chamber and/or the first interstitial space and/or with the atmosphere and/or a tube to convey cooling fluid as will be explained in more detail below. The channel may also extend to other parts of the connector.

The connector may also comprise heat exchanging means (e.g. ribs, stubs) to increase thermal transfer to the environment, respectively surrounding air and the channel may be arranged such that thermal energy can be transported from the contact member to such heat exchanging means. Hence the cooling fluid may be used in order to transport thermal energy from the at least one conductor and/or contact member—which will typically be at least partially arranged in the center of the connector—to the surface of the connector and hence increase dissipation of thermal energy.

The cable assembly may also comprise an auxiliary tube for conducting of an auxiliary fluid. An auxiliary fluid may be the same type of fluid like the cooling fluid as described herein. However, it may also comprise a different fluid. For some applications, the cooling fluid may be a liquid in order to regulate temperature within the cable and the auxiliary fluid may be a gas, such as pressurized air, in order to regulate temperature in a consumer connected to the cable assembly. In particular, the auxiliary fluid may be dehumidified pressurized air in order to cool power electronics and/or energy storage means (batteries) in a consumer, such as an electric device, like an electric vehicle. Therefore, the connector may comprise auxiliary connecting means in order to deliver and/or receive an auxiliary fluid to a consumer device connected to the connector.

According to another aspect of the invention the cable assembly does not comprise at least one tube for conveying of a cooling fluid and instead the second port is fluidically interconnected to a reservoir to drain-off cooling fluid to the reservoir and/or take cooling fluid from the reservoir. Good results may be obtained if the reservoir is the atmosphere, such as e.g. the cooling fluid is air, in particular compressed air drained off through the second port of the connector.

The cable may also comprise at least one signal conductor in order to provide transmission of information along the cable, e.g. between the connector and/or a device connected to the connector and a device connected to the other end of the cable. The signal conductor may comprise e.g. an electric conductor and/or an optical fiber.

It is another object of the present invention to provide a cable for a cable assembly as described herein. It will be appreciated that the cables as described herein can be regarded as an independent inventive concept and thus can be used independently of the described connectors.

It is yet another object of the present invention to provide a connector for a cable assembly as described herein.

A connector may comprise at least one auxiliary channel arranged such that when the connector is connected to a device, a cooling fluid and/or an auxiliary fluid can be conveyed between the cable (respectively connector) and the device. The device may e.g. be a power consumer, such as an electric vehicle.

In one variation the cable assembly further comprises an adapter charger for the interconnection of the at least one conductor to an outer power source and at least one first interstitial space and/or tube conveying the cooling fluid fluid-tight to an external fluid machinery, such as e.g. a fluidic pump. Hereby, the adapter charger may comprise a second chamber with a first port which is interconnected to the tube and a second port which is interconnected to the first interstitial space of the cable so that the cooling fluid is guided alongside the contact member of the adapter charger to cool the same before transmitting the cooling fluid to the external fluid machinery.

The cable may further comprise a supporting cord, which provides a suspension for strain relief of the cable and which interconnects a port of the adapter charger to the connector to provide strain relief of the cable. Other additional ports on the adapter charger are possible for further interconnecting individual cable parts, such as data cable, grounding cable etc.

In a further variation, the cable assembly is surrounded by a second sheath forming a second interstitial space between the at least one cable hose of the conductor and the second sheath. Alternatively, other additional cables may be present within the second sheath such as e.g. data cables, grounding cable, etc. The second interstitial space can receive a control fluid that is pressurized. The second interstitial space is further interconnected to a device that may pressurize the control fluid in the interstitial space, such as e.g. a compressor. A detecting means may be present which senses a loss of the control fluid from the cable assembly. This can be realized by e.g. by measuring the pressure of control fluid and hence being able to detect an overall pressure loss. Such a fluid loss may occur e.g. if the second sheath of the cable or the connector is damaged in a way that the pressurized control fluid leaks out. If such a loss is detected, the cable assembly can then be electrically disconnected from the power source until repair arrangements have been made. This improves the overall safety and reliability of the cable assembly.

It is yet another object of the present invention to provide a charging system for an electric energy storage comprising a cable assembly as described herein.

Another problem arising when using charging systems for electric energy storages comprising cable assemblies turns out to be damage of the connectors due to accidental maloperation. Despite technological progress, most connector assemblies are still relatively heavy, inflexible and bulky. This makes handling of such cables often inconvenient and cause them being accidentally dropped by a user. Due to the typically high weight of the cable and connector, collision of the falling connector with the floor and/or a consumer (e.g. a vehicle) may cause damage to the cable assembly and/or to the consumer. Such damage includes deformation as well as cracks, abrasion and spalling of the consumer and/or the connector, respectively the connector housing. If a damaged connector is continued to be used, this may result in damage of a consumer as well as loss of user safety and malfunction. On the other side, replacement of a connector and/or a complete connector housing is usually costly as well as labor-intensive.

Therefore, a further independent inventive concept relates to a connector that can withstand high mechanical loads as may occur due to maloperation, such as accidental dropping of a cable assembly. Such a connector represents an independent inventive concept that is in particular advantageous if being used for a cable assembly as described herein, but can be advantageous also for other cable assemblies, regardless of the cable and type of connector that is used.

Typically, a connector according to this aspect of the invention comprises a connector housing and at least one impact absorbing means arranged at an outer face of the connector housing. An impact may e.g. be a mechanical impulse caused by a collision between the connector and another object or may be abrading, e.g. when a cable touches ground.

A connector may comprise multiple impact absorbing means arranged at the same or at different regions of the connector housing.

Good mechanical protection of particularly sensitive parts of the connector may be obtained if the connector comprises at least one mechanical guard that at least partially surrounds an electric and/or fluidic contact to be interconnected with a mating corresponding connector and wherein the at least one impact absorbing means is arranged at the mechanical guard. An electric contact may e.g. be a connecting pin, such as a fast DC charging pin, an AC charging pin or a grounding pin.

Good results may be obtained if the mechanical guard comprises a collar and if the at least one impact absorbing means is arranged at a ridge region of the collar. Hence, by using such an arrangement, damage of electric and/or fluidic contacts as well as a mechanical guard due to accidental dropping of the connector can be significantly reduced.

The at least one impact absorbing means may comprise an augmentation at a corner and/or at a bend of the connector housing to distribute an impact load induced in the at least one impact absorbing means. The augmentation may e.g. be a volumetric augmentation and/or an augmentation by shape and/or an augmentation by type of material. Hence regions that are particularly prone to damage may be efficiently augmented without interfering with the main functionality of the connector, as will be shown in more detail below.

For some applications, the connector housing may be mainly made from a first material and the at least one impact absorbing means may be mainly made from a second material, whereby the elastic modulus of the first material is higher than the elastic modulus of the second material.

Good results may be obtained if the at least one impact absorbing means is at least partially made from an elastic material and/or a visco-elastic material. Depending on the application, the at least one impact absorbing means may be at least partially made from a material chosen from the group comprising: rubber, silicone, polyurethane.

The at least one impact absorbing means may be interconnected with the connector housing by means of a chemical connection, in particular by means of an adhesive connection and/or by a welding connection. Hence, a particularly reliable, tamper- and sabotage-proof connector can be obtained.

Alternatively or in addition, the at least one impact absorbing means may be interconnected with the connector housing by means of mechanical connection, in particular by a clamping connection and/or by a snap connection and/or by a frictional connection. Thus, a connector that can be manufactured relatively easily can be obtained. As well, if desired, such an interconnection allows easy replacement of an impact absorbing means for example if a certain degree of abrasion of the impact absorbing means is obtained.

The at least one impact absorbing means may comprise at least one protrusion arranged to be received by an opening arranged at the connector housing in order to establish a mechanical interconnection between the connector housing and the at least one impact absorbing means. Thus a particularly good mechanical interconnection between the at least one impact absorbing means and the rest of the connector housing can be obtained. Alternatively or in addition, the at least one impact absorbing means may comprise at least one opening arranged to receive at least one protrusion arranged at the connector housing. Mechanically highly competent interconnections between at least one impact absorbing means and a connector housing for some types of connectors may be obtained if the opening is a groove.

Cost-effective production of some types of connectors may be obtained if the at least one impact absorbing means is interconnected with the connector housing by means of a two components injection molding process.

In order to obtain a connector that is particularly resistant to atmospheric attack, the at least one impact absorbing means may comprise at least one sealing means arranged to interact with a corresponding mating connector such that when in a coupled state with the corresponding mating connector an essentially fluid tight interconnection between the sealing means and the corresponding mating connector is established.

Good results may be obtained if the at least one sealing means comprises a sealing face or is a sealing face arranged to align with a corresponding sealing means (e.g. a corresponding sealing face and/or ridge and/or edge) of a corresponding mating connector when in a coupled state.

In order to increase user safety, the at least one impact absorbing means may comprise a damage indicating means arranged to indicate a critical load history and/or critical wear of the connector. Such a damage indicating means may indicate prior critical stress and/or strain to the connector. Thus, it can e.g. provide information to a user in order to decide if a part of the connector (e.g. a whole housing or an impact absorbing means) has to be replaced and/or a deeper inspection of the connector has to be performed in order to detect critical damage and/or if the connector has to be replaced. The damage indicating means may comprise a first solid body with a first color that is at least partially surrounded by a second solid body which at least partially has a second color that differs from the first color. Thus e.g. visual appearance of the first color may indicate abrasion and/or spalling.

Another aspect of the invention is directed to providing an impact absorbing means for a connector.

BRIEF DESCRIPTION OF THE DRAWINGS

The herein described invention will be more fully understood from the detailed description of the given herein below and the accompanying drawings, which should not be considered as limiting to the invention described in the appended claims.

FIG. 7a schematically shows a fifth embodiment of a cable for a cable assembly according to the present invention in a perspective view;

FIG. 7b shows a cross-section of the cable of FIG. 7a;

FIG. 8a schematically shows a sixth embodiment of a cable for a cable assembly according to the present invention in a perspective view;

FIG. 8b shows a cross-section of the cable of FIG. 8a;

FIG. 20 shows a perspective view of an adapter of the charging station for a cable assembly according to FIG. 17 with the adapter charger being partially clipped for illustrative purposes;

FIG. 21 shows the adapter charger according to FIG. 20 in a side view with the charger being partially clipped for illustrative purposes;

FIG. 22 shows first details of the flange section of the adapter charger according to the cable assembly of FIG. 21;

DETAILED DESCRIPTION OF THE INVENTION

The foregoing summary, as well as the following detailed description of the preferred embodiments, is better understood when read in conjunction with the appended drawings. For the purposes of illustrating the invention, an embodiment that is presently preferred, in which like numerals represent similar parts throughout the several views of the drawings, it being understood, however, that the invention is not limited to the specific methods and instrumentalities disclosed.

Figure 1:
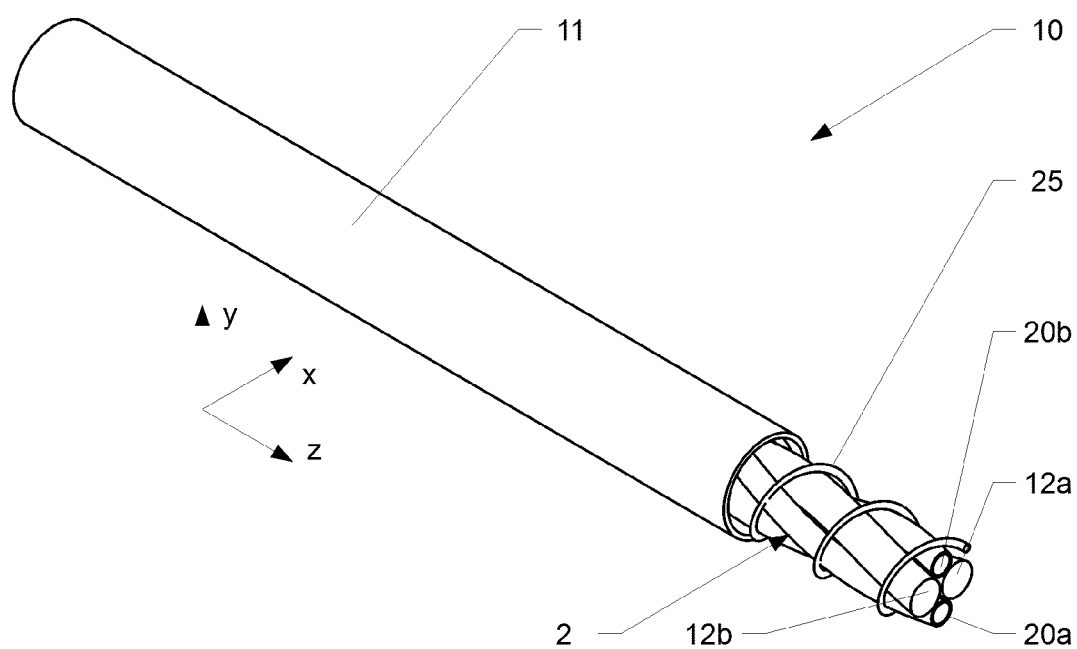
FIG. 1 schematically shows a first embodiment of a cable for a cable assembly according to the present invention in a perspective view.
Figure 2:
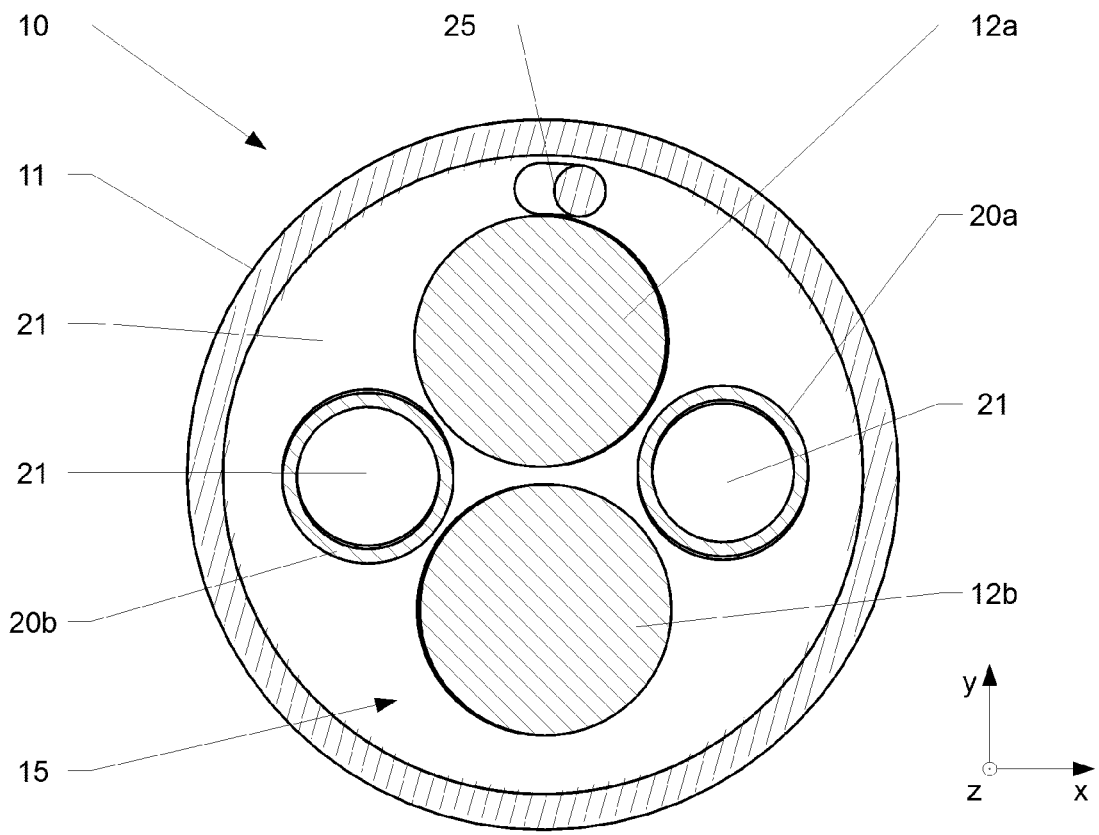
FIG. 2 shows a cross-section of the cable of FIG. 1.

FIG. 1 and FIG. 2 show a first possible embodiment of a cable 10 for a cable assembly 1 according to the invention. The cable 10 comprises a cable hose 11. Inside of the cable hose 11 a first and a second conductor 12a, 12b are arranged which extend along the cable 10. The conductors 12a, 12b are spaced a distance apart the cable hose 11, forming a first interstitial space 15. As well, the cable 10 comprises two tubes 20a, 20b that are arranged for conveying a cooling fluid along the cable 10 and are arranged inside of the cable hose 11. The conductors 12a, 12b and the tubes 20a, 20b are arranged such that they form some kind of a bundle 2 and are twisted/stranded in a first lay direction. The first interstitial space 15 between the bundle 2 and the cable hose 11 as well as between the conductors 12a, 12b and the tubes 20a, 20b can be filled/flooded with cooling fluid as well. During operation of a cable assembly (not shown), cooling fluid typically will first be conveyed in the tubes 20a, 20b in a first direction (e.g. positive z-direction) from a first end of the cable 10 to a second end, where a connector (not shown) is arranged. In the connector or a cable terminal means, the cooling fluid will be bypassed to the first interstitial space 15 where it is conveyed back to the first end of the cable 10. Between the bundle 2 and the cable hose 11 a spacer 25 is arranged which keeps the conductors 12a, 12b spaced apart from the cable hose 11 such that the cooling fluid 21 can circulate around the conductors 12a, 12b which allows highly efficient heat transfer from the conductors 12a, 12b to the cooling fluid. The spacer 25 is wound helically around the bundle 2 in a lay direction that is opposite to the one of the bundle 2, which improves distribution of the cooling fluid 21 within the first interstitial space 15 and hence increases heat transfer. At the same time, the spacer 25 structurally stabilizes the bundle 2 during assembly of the cable 10. With an embodiment of a cable 10 as shown in FIG. 1 and FIG. 2 high electrical currents can be transmitted using conductors 12a, 12b that have a relatively low cross section. Hence, an embodiment of a cable 10 as shown in FIG. 1 and FIG. 2 can be used to conduct high electrical currents while still being relatively flexible and thus easy to handle.

Figure 3:
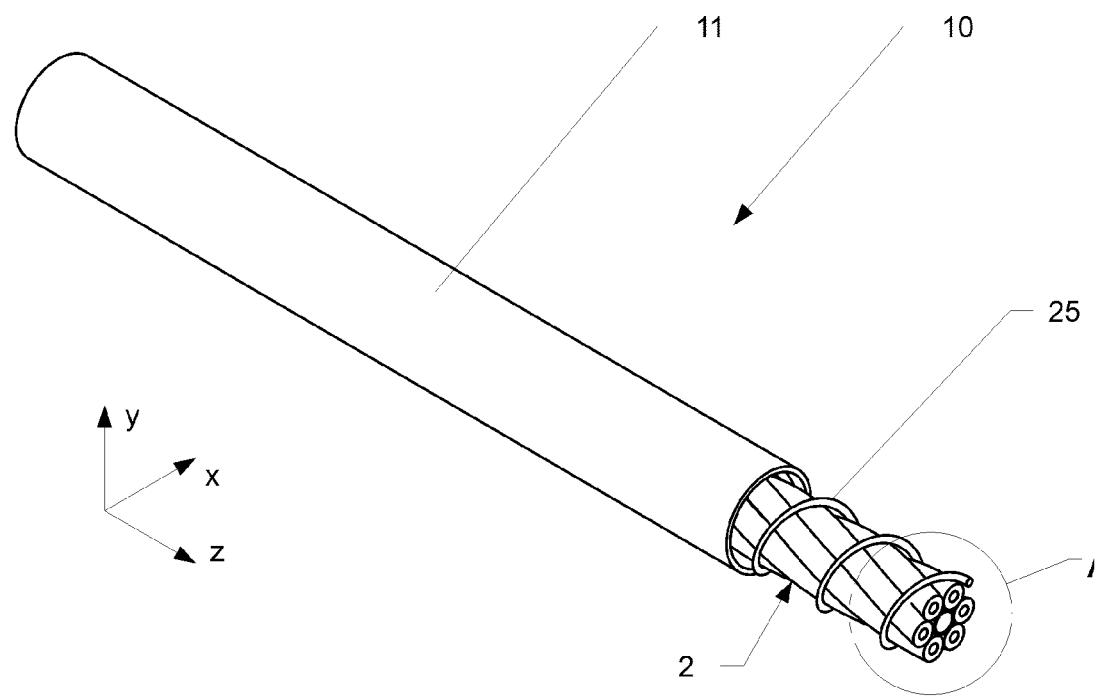
FIG. 3 schematically shows a second embodiment of a cable for a cable assembly according to the present invention in a perspective view.
Figure 4:
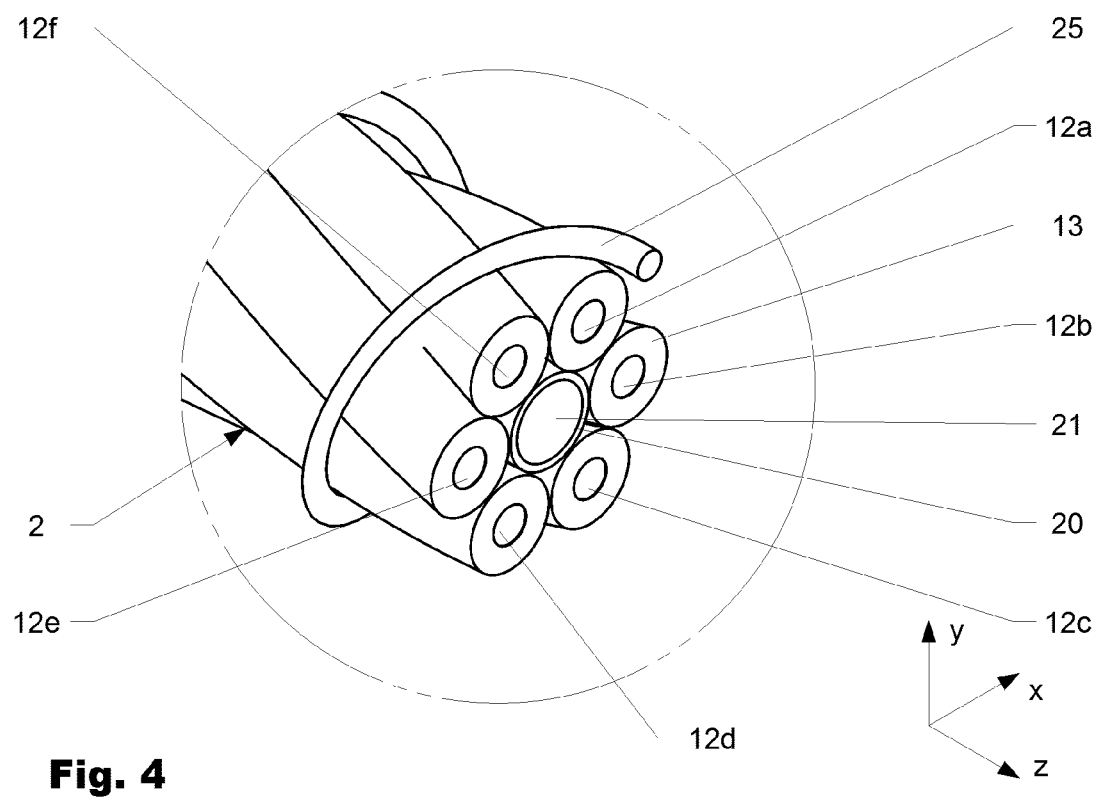
FIG. 4 shows detail A of FIG. 3.

FIG. 3 and FIG. 4 show another embodiment of a cable 10 for a cable assembly according to the invention. The cable 10 comprises a central tube 20 for conveying of a cooling fluid 21. Six conductors 12a-f are arranged radially around the tube 20 between the tube 20 and the cable hose 11. Each of the conductors 12a-f comprises a first sheath 13 that provides electrical insulation. The resulting bundle 2 is stranded in a first lay direction and is helically wound by a spacer 25 in a second lay direction. Thus, again distribution of the cooling fluid 21 in the first interstitial space 15 and consequently also heat exchange can be improved.

Figure 5:
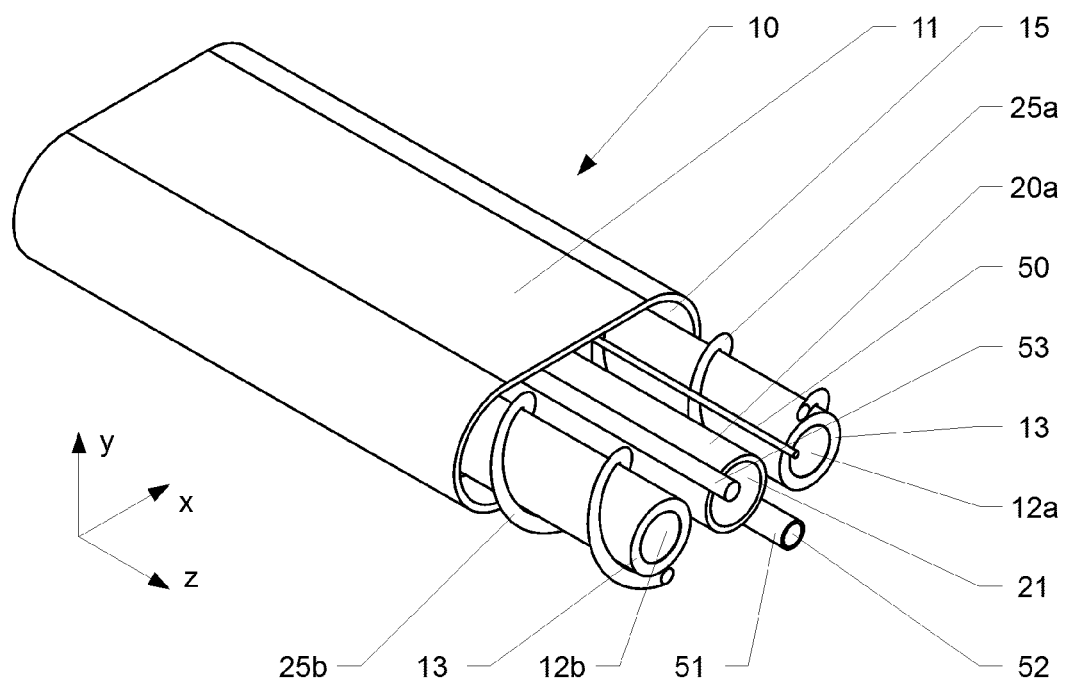
FIG. 5 schematically shows a third embodiment of a cable for a cable assembly according to the present invention in a perspective view.

FIG. 5 shows another embodiment of a cable 10 for a cable assembly according to the invention. The cable hose 11 has an oblate shape, hence does not have a circular cross-section. The cable 10 comprises two conductors 12a, 12b which are both helically wound by a separate spacer 25a, 25b and a tube 20a for conveying of a cooling fluid. As well, an auxiliary tube 51 for conveying of an auxiliary fluid and a signal conductor 53 which serves as thermal sensor are arranged in the first interstitial space 15 between conductors 12a, 12b and cable hose 11. As well, the embodiment of a cable 10 shown comprises a thermal sensor 50 that is arranged in the first interstitial space 15. The thermal sensor 50 shown is embodied a highly thermo-sensitive electrical conductor and serves to detect critical temperature at any location inside of the cable 10 along (z-direction) the cable 10.

Figure 6:
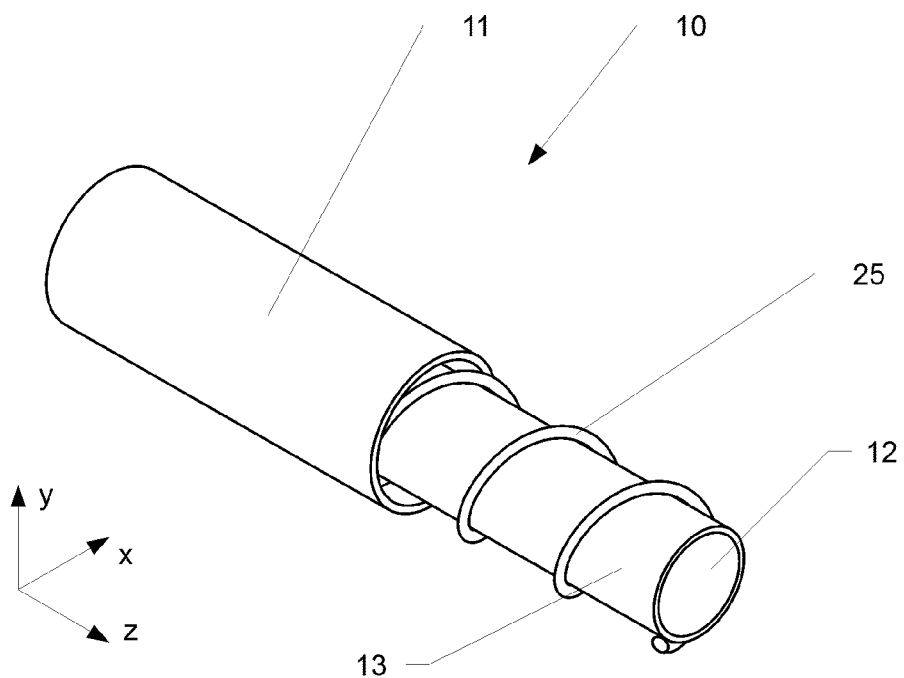
FIG. 6 schematically shows a fourth embodiment of a cable for a cable assembly according to the present invention in a perspective view.

FIG. 6 shows another embodiment of a cable 10 for a cable assembly according to the invention which comprises a conductor 12 arranged in the cable hose 11 and which is helically wound by a spacer 25. Outside of the cable hose 11 a tube (not shown) for conveying of a cooling fluid may be arranged.

FIGS. 7a and 7b show an embodiment of a cable 10 with a concentric structure. In the center of the cable 10 a tube 20 to convey a cooling fluid 21 is arranged. A first concentric layer of conductors 28a envelopes the tube 20, allowing thermal transfer between the first concentric layer of conductors 28a and the cooling fluid 21 inside of the tube 20. A first electrically insulating tube 26 envelops the first concentric layer of conductors 28a. A second concentric layer of conductors 28b envelopes the first electrically insulating tube 26. A second electrically insulating tube 27 which is also impermeable for cooling fluid envelops the second concentric layer of conductors 28b. Spacers 25a-f are arranged around the second concentric layer of an insulation in order to define a first interstitial space 15 between the second insulating tube 27 and the cable hose 11 of the cable to convey a cooling fluid 21 in a second direction along the cable 10. Good results using such a cable 10 may be obtained if cooling fluid 21 with an initial low temperature is first conveyed in the tube 20 along the cable 10 whereby sufficient thermal transfer between the first concentric layer of conductors 28a and the cooling fluid 21 takes place. The low temperature of the cooling fluid induces a high temperature gradient which effects efficient heat dissipation from the first concentric layer of conductors 28a to the cooling fluid 21 in the tube 20, although the area of interface between the first concentric layer of conductors 28a (respectively the first electrically insulating tube 26) and the tube 20 is relatively low. After being conveyed along the cable 10, the cooling fluid has a slightly increased temperature and is bypassed to the first interstitial space 15 between where it is conveyed in the opposite direction along the cable 10. As the area of interface between the second concentric layer of conductors 28b (respectively the second electrically insulating tube 27) and the first interstitial space 15 is relatively large, sufficient dissipation of heat from the second concentric layer of conductors 28b to the cooling fluid 21 in the first interstitial space 15 can be obtained, even if the temperature of the cooling fluid 21 is higher than it initially was in the tube 20.

Figure 9:
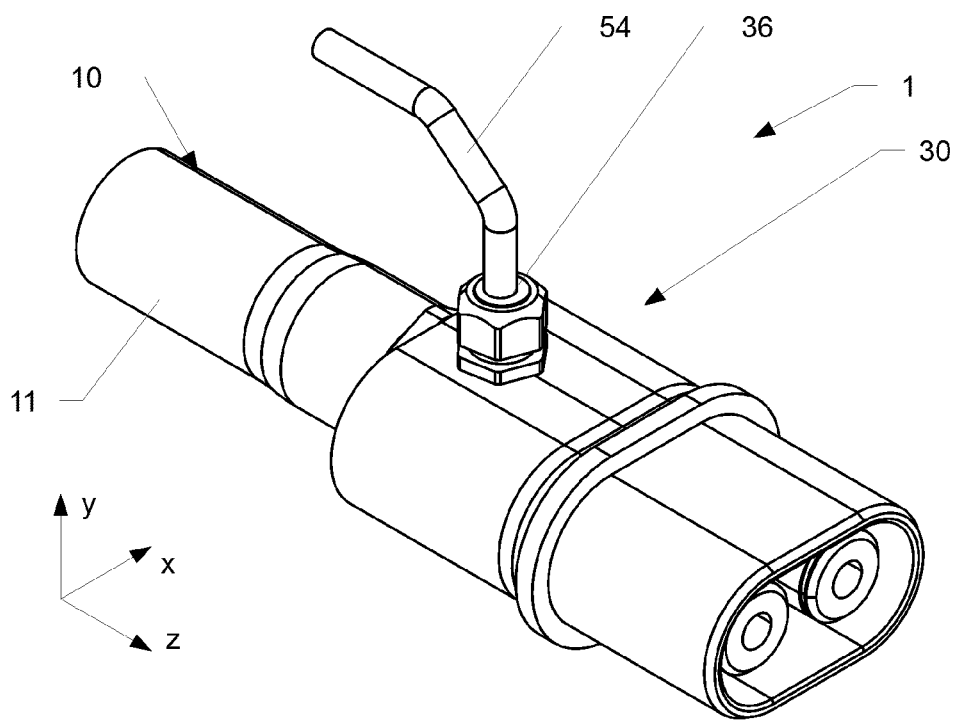
FIG. 9 schematically shows an embodiment of cable assembly according to the present invention in a perspective view.
Figure 10:
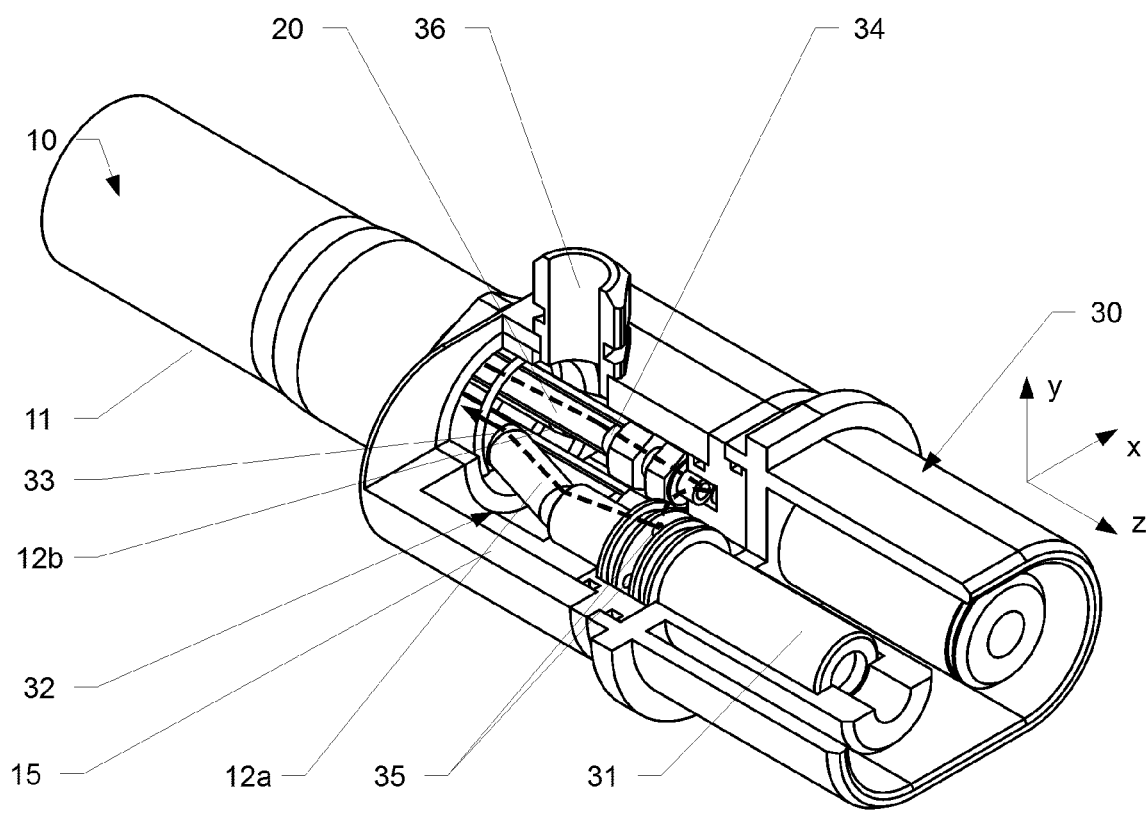
FIG. 10 shows the cable assembly of FIG. 9 with the connector being partially clipped for illustrative purposes.

FIGS. 8a and 8b show a second embodiment of a cable 10 that has a concentric structure. In the center of the cable 10 a stranded conductor 12 is arranged which comprises a first sheath 13 that provides electrical insulation as well as it is impermeable for cooling fluid. A first electrically insulating tube 26 which is impermeable for cooling fluid envelops the first sheath 13, spaced a distance apart from the first sheath 13. The first sheath 13 and the first electrically insulating tube 26 are interposed with first spacers 25 arranged around the center conductor 12 in order to define a first interstitial space 15a between the first sheath 13 and first electrically insulating tube 26 to convey a cooling fluid in a first direction along the cable. A concentric layer of multiple conductors 28a is arranged such that it envelops the first electrically insulating tube 26. A second electrically insulating tube 27 is be arranged such that it envelops the concentric layer of multiple conductors 28a. Second spacers 25 are arranged around the second electrically insulating tube 27 in order to define an additional interstitial space 15b between the second electrically insulating tube 27 and the cable hose 11 to convey a cooling fluid in a second direction along the cable 10 as schematically shown in FIG. 8b. For the same reasons as given above regarding FIGS. 7a and 7b, efficient cooling may be obtained if cooling fluid is first conveyed in the first interstitial space 15a and subsequently in the additional interstitial space 15b. FIG. 9 and FIG. 10 show an embodiment of a cable assembly 1 according to the invention, comprising a cable 10 with a cable hose 11 and two conductors 12a, 12b which are arranged inside the cable hose 11. At one end of the cable 10 a connector 30 is arranged. The connector 30 comprises a contact member 31 which is electrically interconnected with one of the conductors 12a. The connector 30 further has a chamber 32 which comprises a first port 33 that is interconnected with the cable hose 11, respectively the first interstitial space 15 inside the cable hose 11. As well, the chamber 32 comprises a second port 34 which is interconnected with a tube 20 (only shown in FIG. 10) arranged in the cable 10 for conveying of a cooling fluid 21. The cable 10 may be a type of cable as disclosed in FIG. 1. As indicated in FIG. 10 by means of the dashed arrow, the cooling fluid 21 may enter the chamber 32 via the second port 34 and then be conveyed in a channel 35 for cooling the contact member 31. Hence cooling fluid 21 is provided by the tube 20 and conveyed from the second port 34 through the channel 35 in order to cool the contact member 31 and afterwards through the chamber 32 to the first port 33 from where it is conveyed in the first interstitial space (not shown in detail) of the cable 10 in order to cool the conductors 12a, 12b arranged inside of the cable hose 11. In addition, as shown in FIG. 9, the connector 30 comprises a data port 36 that can serves as an entry point for a data cable 54.

Figure 11:
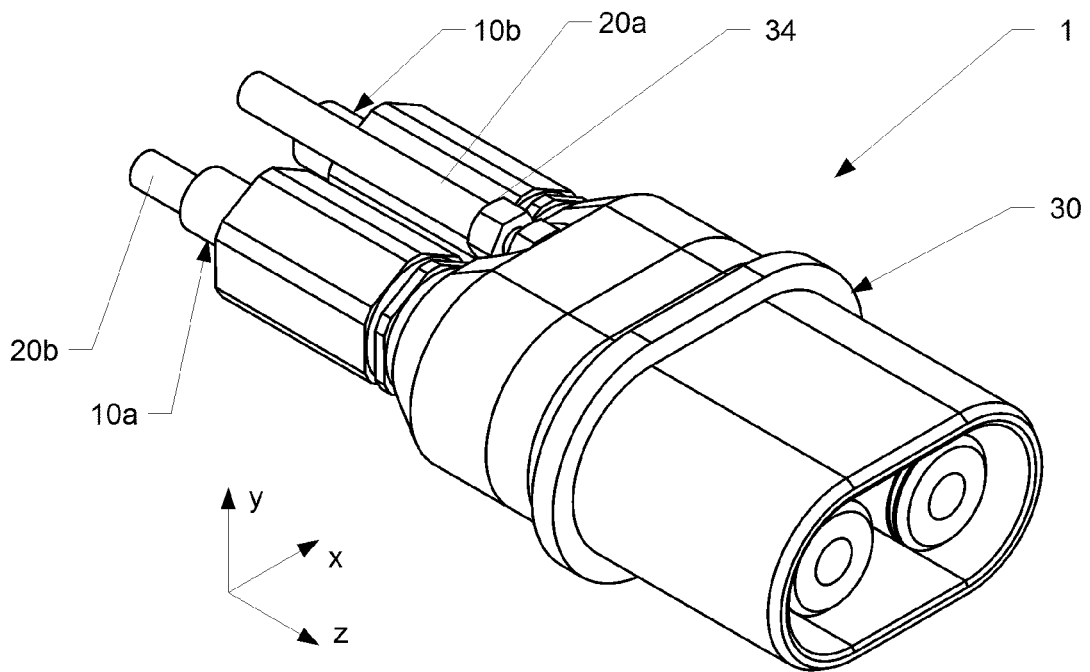
FIG. 11 schematically shows another embodiment of a cable assembly according to the present invention in a perspective view.
Figure 12:
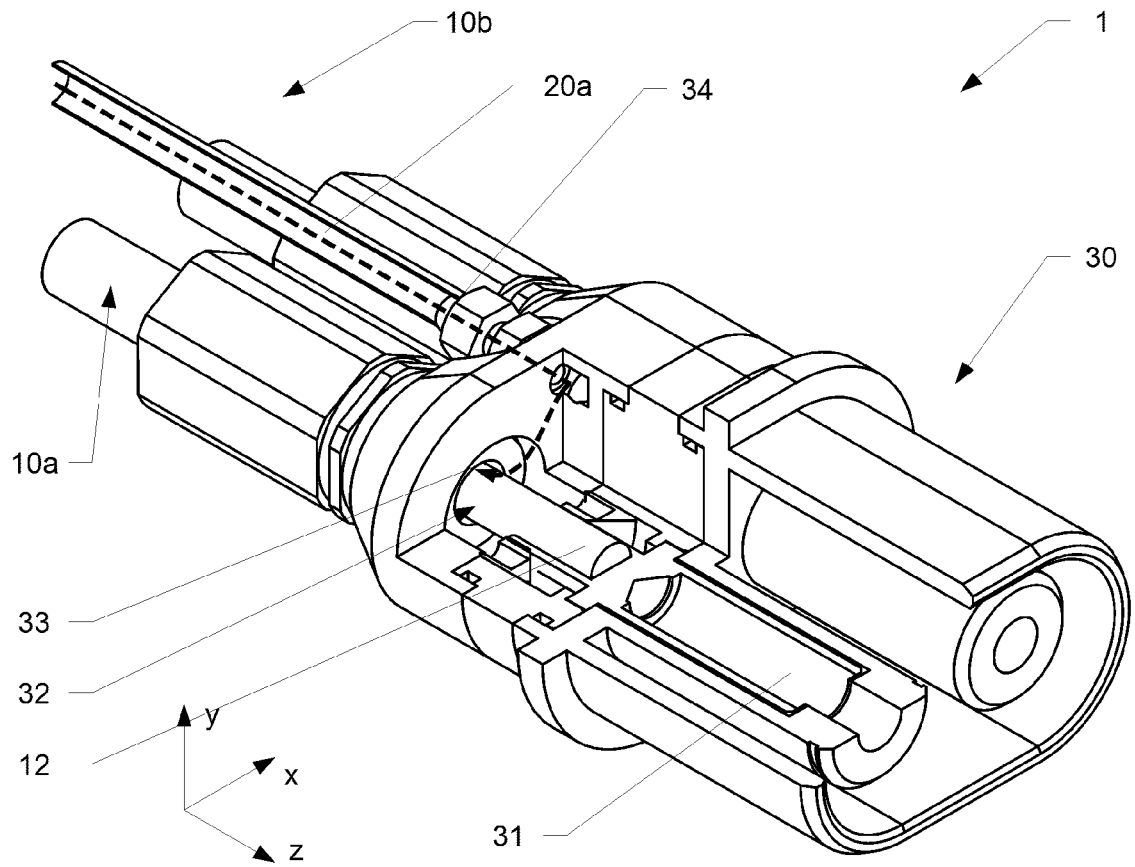
FIG. 12 shows the cable assembly of FIG. 11 with the connector being partially clipped for illustrative purposes.

FIG. 11 and FIG. 12 show a further embodiment of a cable assembly 1 according to the invention, comprising two cables 10a, 10b which each comprise only one conductor 12 and one connector 30 (not all visible in the Figures). The cables 10a, 10b may e.g. be a type of cable as shown in FIG. 6. As schematically shown in FIG. 12, for each one of the cables 10a, 10b the connector 30 comprises a chamber 32 which has a first port 33 interconnected with the cable hose 11a of the cable 10a-respectively the first interstitial space (not shown) therein- and a second port 34 that is arranged to be connected to a tube 20a for conveying of a cooling fluid. As in FIG. 9 and FIG. 10, cooling fluid (indicated by the dashed arrow) can be conveyed from the second port 34 through the chamber 32, thereby cooling a portion of the connector 30, to the first port 33 and then through the first interstitial space (not shown in detail) of the cable 10a in order to cool the conductor 12 arranged inside of the cable hose 11. Alternatively, also only one tube 20a may be used in order to provide cooling fluid both cables 10a, 10b.

Figure 13:
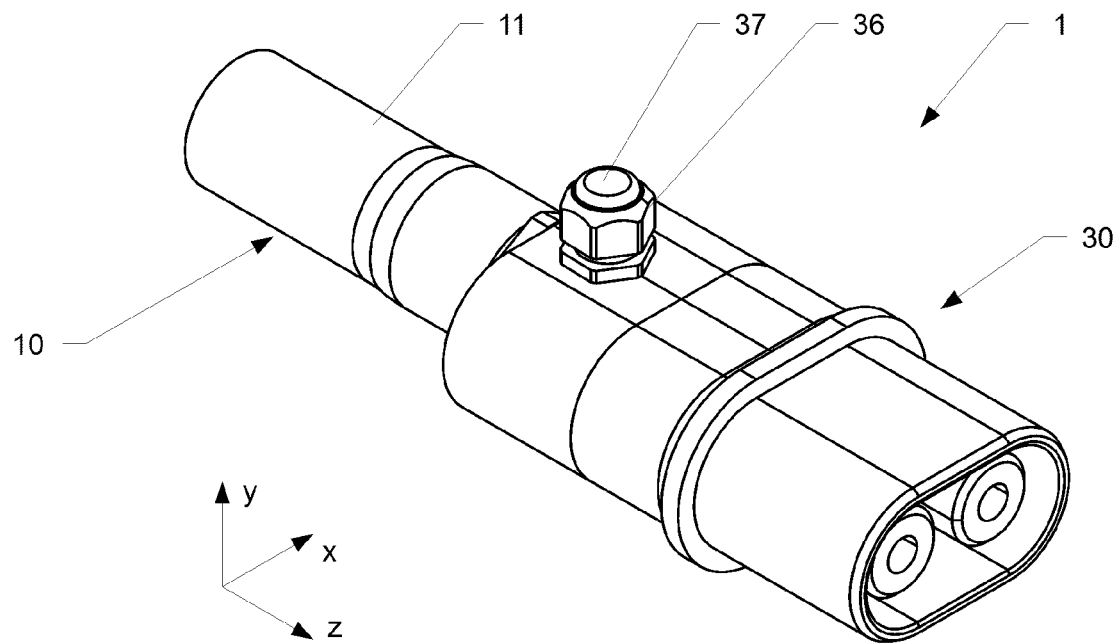
FIG. 13 schematically shows another embodiment of a cable assembly according to the present invention in a perspective view.
Figure 14:
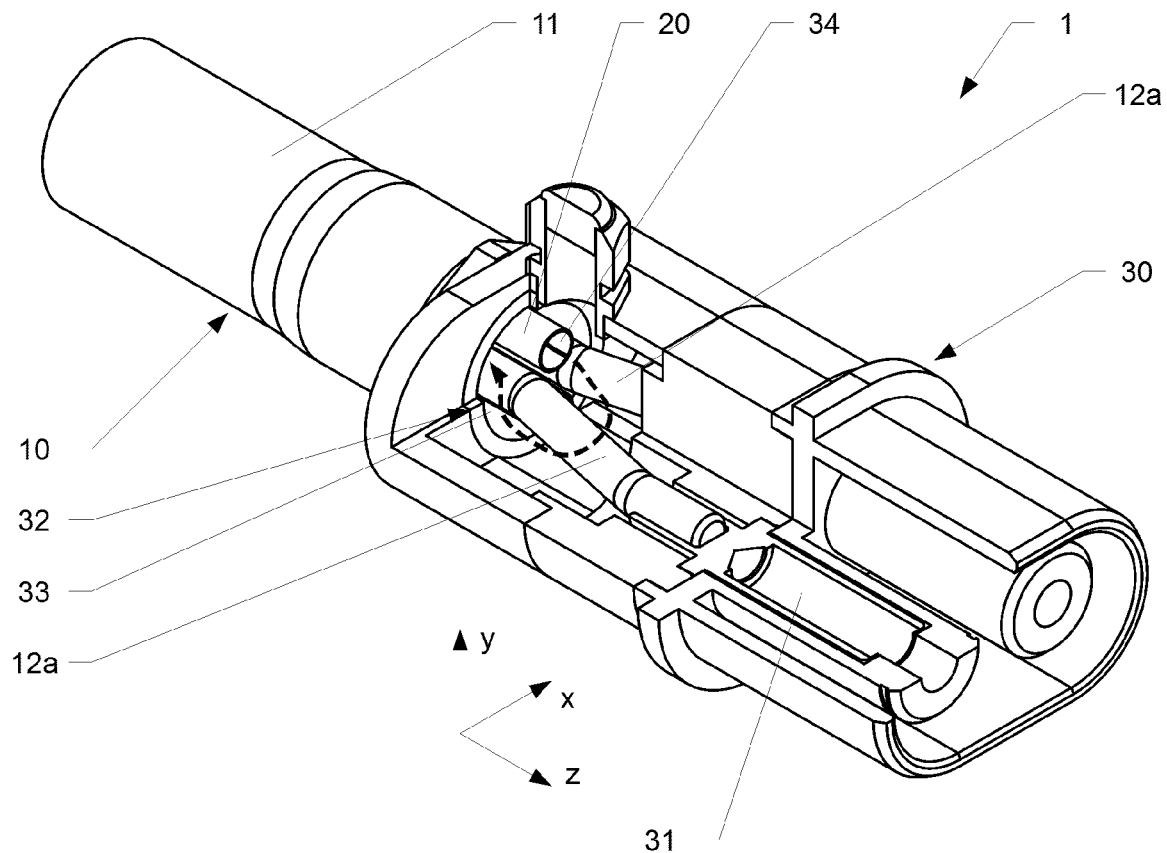
FIG. 14 shows the cable assembly of FIG. 13 with the connector being partially clipped for illustrative purposes.

FIG. 13 and FIG. 14 show a further embodiment of a cable assembly 1 according to the invention with a similar setup like the embodiment 1 shown in FIG. 11 and FIG. 12. Yet, the cable assembly 1 shown in FIG. 13 and FIG. 14 comprises only one cable 10 interconnected with a connector 30. In order to obtain temperature regulation of the cable assembly 1—respectively cooling of the conductors 12 —, cooling fluid (indicated by the dashed arrow) provide by a tube (not shown) can enter a chamber 32 arranged within the connector 30 via a second port 34 and circulate around conductors 12a, 12b arranged inside of the cable hose 11 and extending through the chamber 32 to contact members 31 (only one contact member is visible). Thus, the portions of the conductors 12a, 12b arranged within the chamber 32 can be prevented from overheating. As well, the chamber 32 comprises a first port 33 that is interconnected with the cable hose 11 and through which the cooling fluid can leave the chamber and be conveyed in the first interstitial space (not shown) inside of the cable hose 11. In addition, the connector 30 comprises a data port 36 that can serves as an entry point for a data cable (not shown) and is fluidically sealed by a closure 37.

Figure 15:
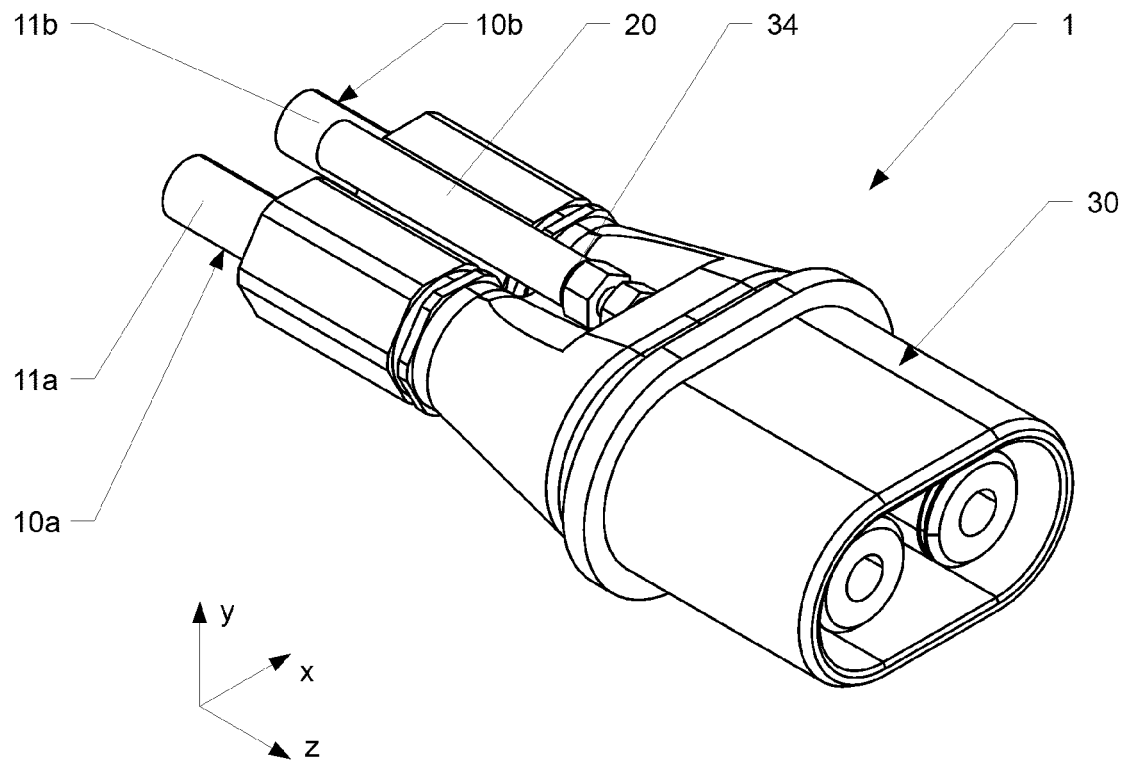
FIG. 15 schematically shows another embodiment of a cable assembly according to the present invention in a perspective view.
Figure 16:
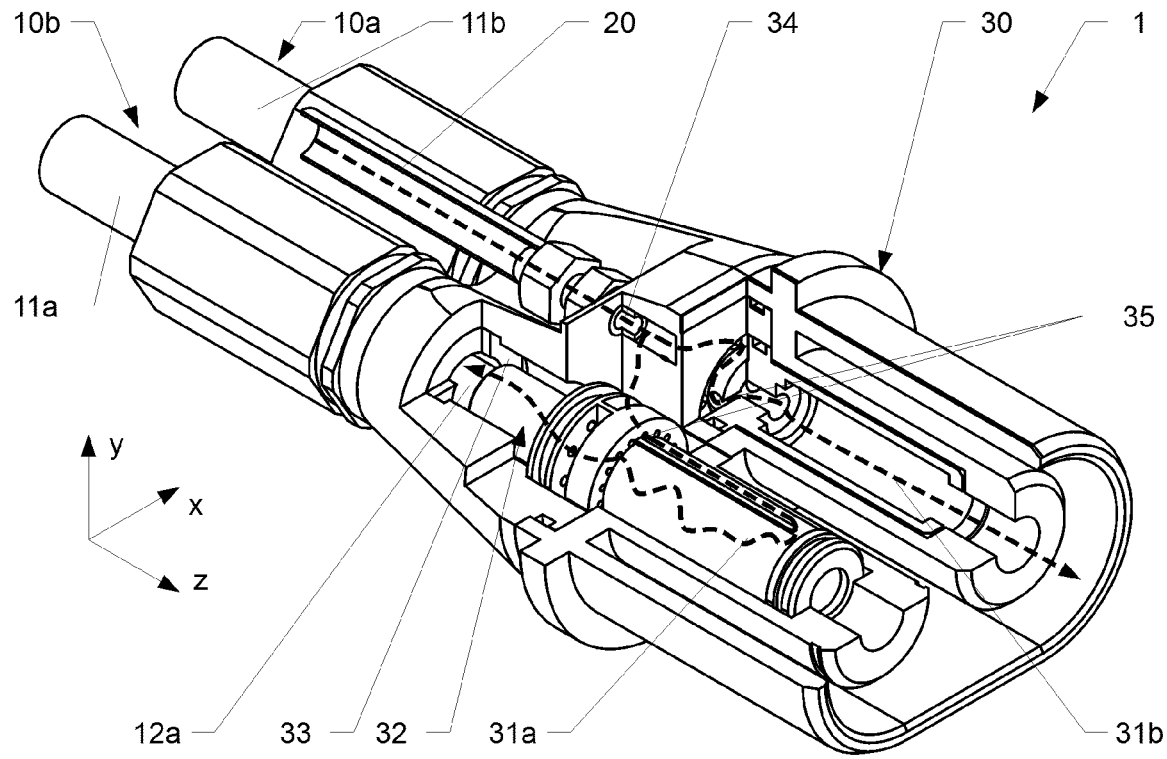
FIG. 16 shows the cable assembly of FIG. 15 with the connector being partially clipped for illustrative purposes.

FIG. 15 and FIG. 16 show a further embodiment of a cable assembly 1 according to the invention which is similar to the embodiment shown in FIG. 11 and FIG. 12. As indicated by the dashed arrows, the cable assembly 1 comprises channels 35 for cooling of two contact members 31a, 31b whose designs are differing from each other. The contact members 31a in the foreground of FIG. 16 is designed such that the cooling fluid can circulate around it, whereas the other contact member 31b is designed such that the cooling fluid can enter an opening arranged inside of the contact member 31b, such that it can be conveyed to a corresponding connector (not shown) interconnected with the cable assembly 1.

Figure 17:
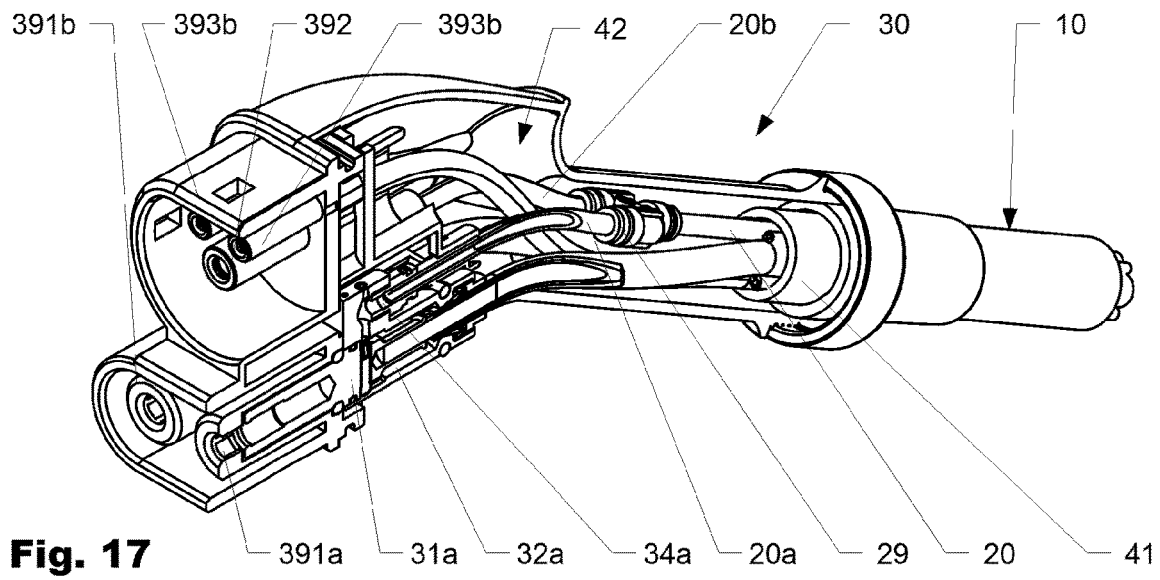
FIG. 17 schematically shows another variation of a cable assembly according to the present invention in a perspective view with the connector being partially clipped for illustrative purposes.

FIG. 17 shows another variation of a cable assembly 1 according to the invention comprising a cable 10 and a connector 30. For better illustration purposes, the connector 30 is partly sectioned to gain an inside view. The internal structure of the feeding cable 10 can be seen in FIG. 18. FIG. 19 shows a detailed view of the connector 30.

Figure 18:
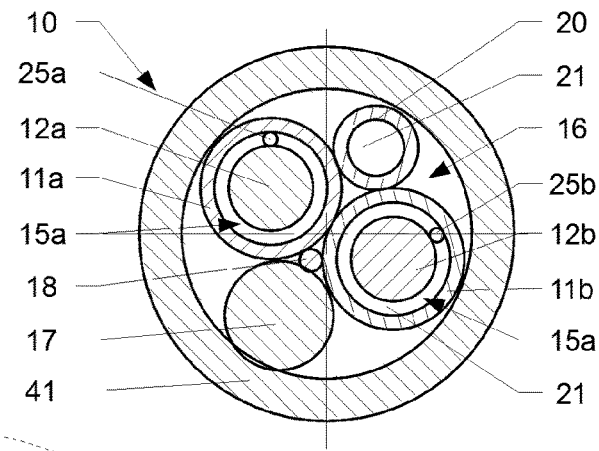
FIG. 18 shows a breakout of the cable according to the cable assembly of FIG. 18.
Figure 19:
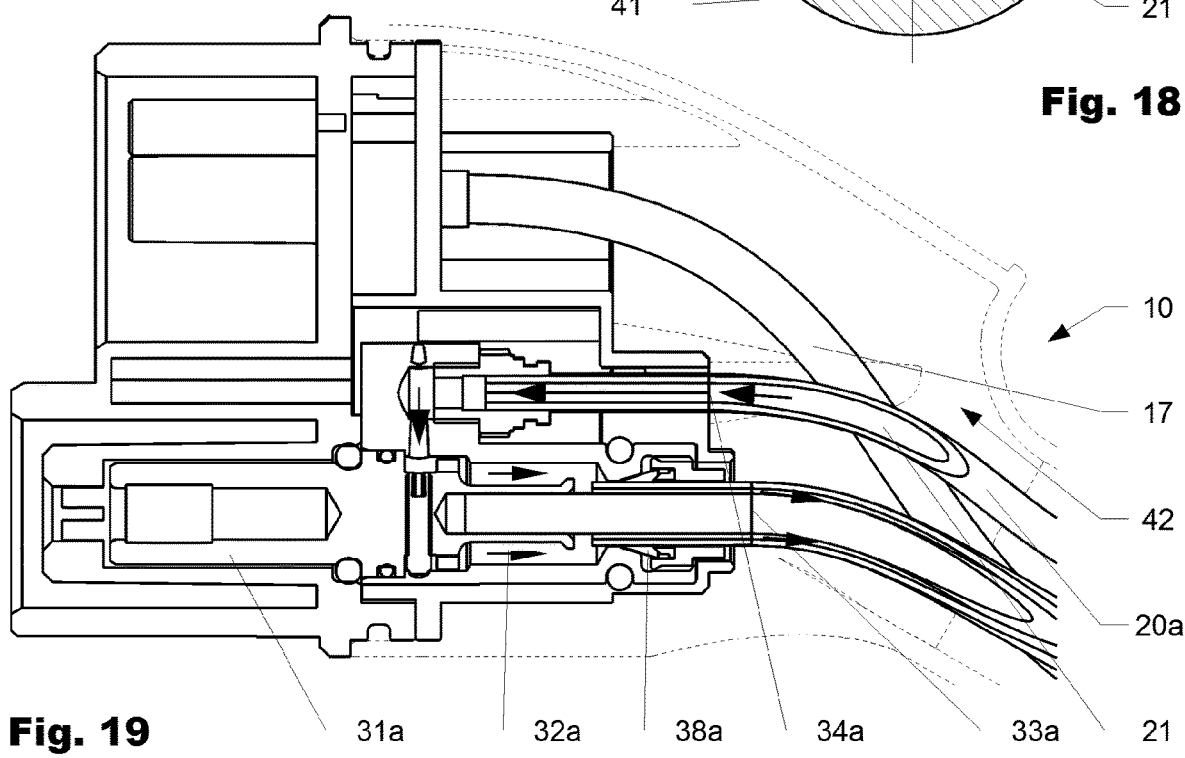
FIG. 19 shows details of the connector according to the cable assembly of FIG. 17.

FIG. 18 shows the cable 10 feeding the connector 30, which comprises two high power conductors 12a, 12b to provide the sufficient electrical energy for a fast charging process. Each conductor 12 is surrounded by a spacer 25a, 25b and a cable hose 11a, 11b. Between each cable hose 11a, 11b and conductor 12a, 12b is a first interstitial space 15a, 15b which is filled with a cooling fluid 21. The cooling fluid 21 in the first interstitial space 15a, 15b is flowing in the direction away from of the connector 30. A tube 20 accommodates the cooling fluid 21 flowing the opposite direction. A cord 18 for strain relief and a grounding cable assembly 17 may be included in the cable as indicated. Further additional cable parts are possible but not shown here in detail. An outer shelf 41 surrounds all individual cable parts forming a second interstitial space 16 between the individual cable parts present within the same.

As seen in FIGS. 17 and 19, each conductor 12a, 12b and cable hose 11a, 11b is connected to a first port 33a, 33b inside the connector 30. Here, each conductor 12a, 12b is electrically connected to a contact member 31a, 31b. The tube 20 coming from the cable 10 with the cooling fluid 21 is split at a fluid divider 29 in two separate streams in tubes 20a, 20b which are each connected to a second port 34a, 34b.

From each second port 34a, 34b, the cooling fluid 21 flows through a channel 35a, 35b in a first chamber 32a, 32b surrounding the contact members 31a, 31b to cool the same. A sealing 38a, 38b is provided to prevent further effusion of the cooling fluid 21 inside the connector 30. Each first chamber 32a, 32b is connected to a first port 33a,33b, where the conductor 12a, 12b and cable hose 11a, 11b are connected so that the cooling fluid can leave the first chamber 32a, 32 b through the first interstitial space 15a, 15b to be fed back. The preferred direction of travel form the cooling fluid 21 is indicated in the detailed view of FIG. 19 by arrows, however, an opposite direction of the cooling fluid 21 is also possible.

The connector 30 comprises several connecting pins 39 to configure the electrical connection to the chargeable vehicle: Two high power DC charging pins 391 for the fast charging of the vehicle battery are each connected to the contact members 31a, 31b, respectively the conductors 12a, 12b. Additionally, a grounding pin 392 to facilitate electrical earth and two optional AC charging pins 393a-b (220 V) may be provided (respective cables are not illustrated in the cable built-up in FIG. 20).

At the other end of the cable 10, the cable is connected to a power station for electrical vehicles through an adapter charger 60, as depicted by FIGS. 20 and 21. The adapter charger 60 comprises a contact section 610 and a flange section 620. Details of the flange section 620 are shown in FIG. 23, meanwhile details of the contact section 610 are shown in FIG. 24.

Figure 23:
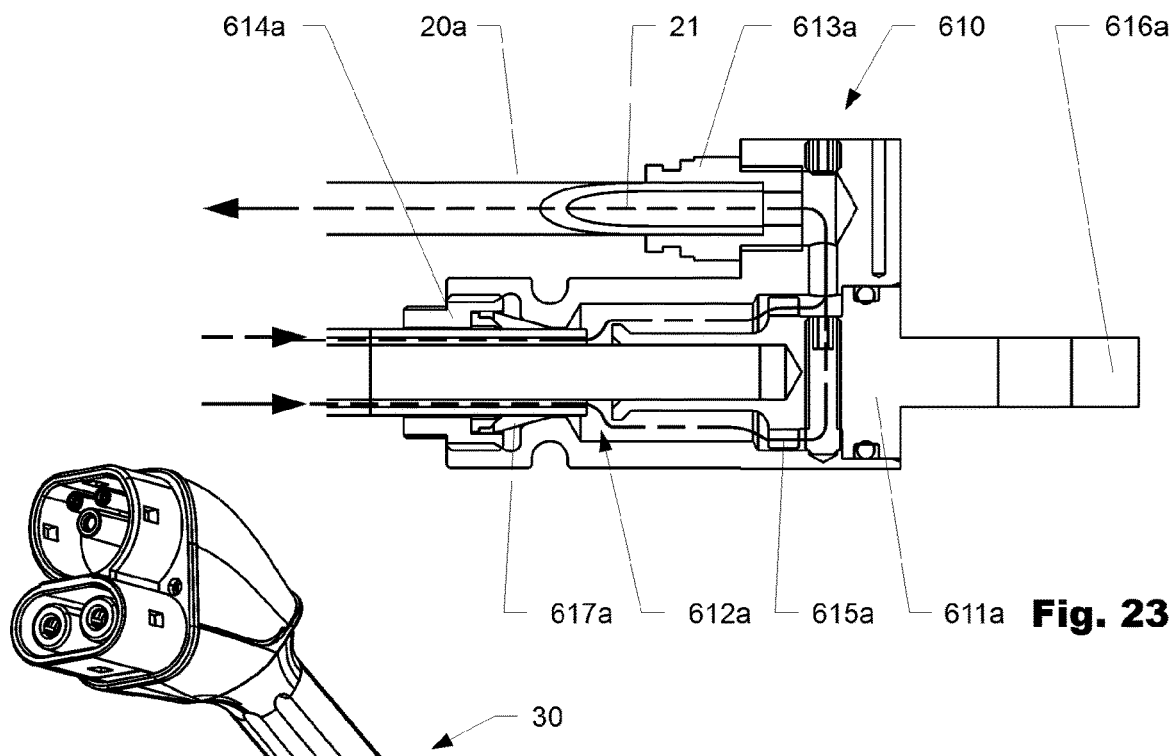
FIG. 23 shows second details of the contact section of the adapter charger according to the charger of FIG. 21.
Figure 24:
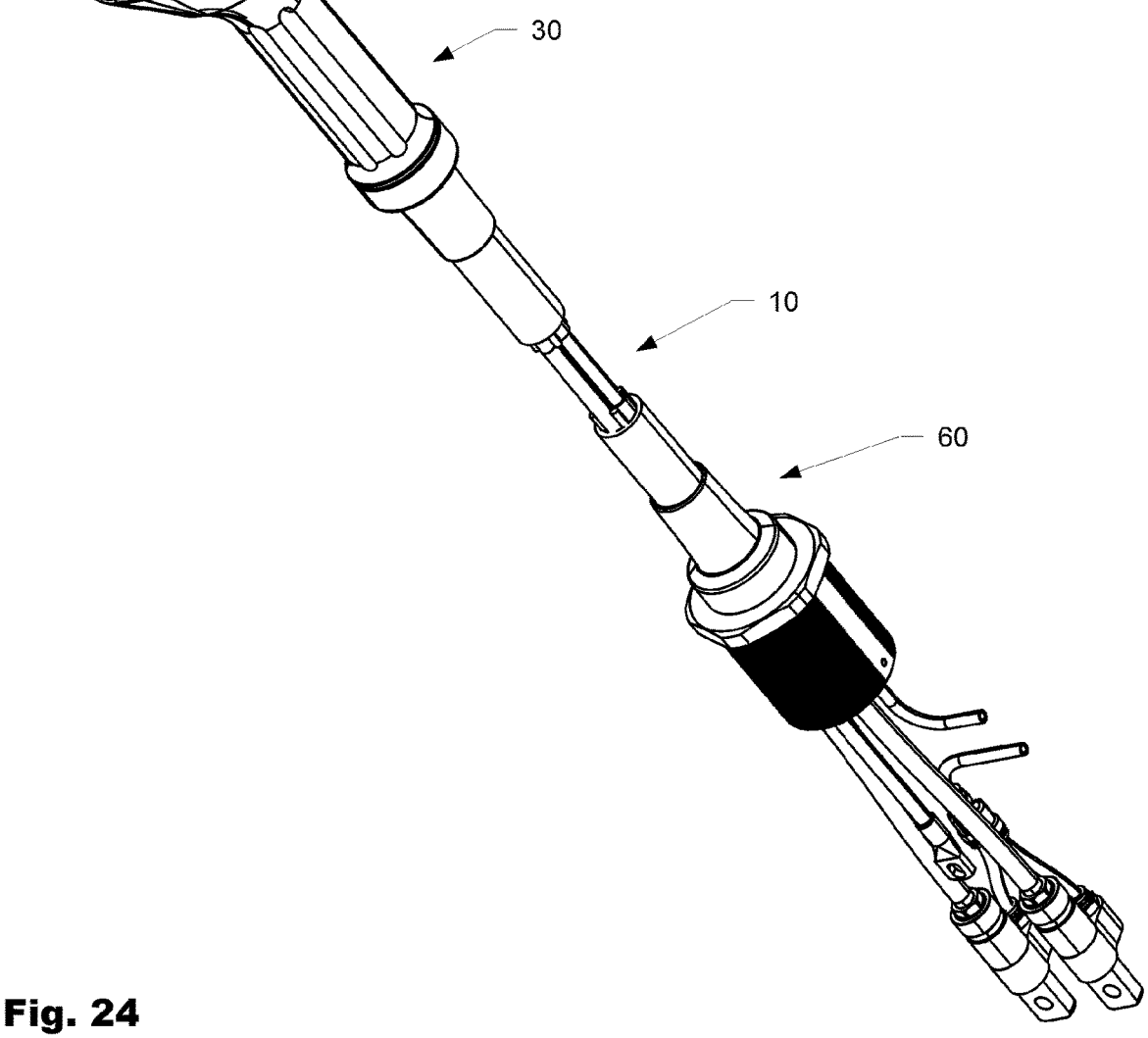
FIG. 24 shows a cable assembly comprising a connector according to FIG. 17 and a charger according to FIG. 20.

As depicted in FIG. 23, the flange section 620 is cylindrically formed and comprises an internal hollow first chamber 42. On the outside the flange section 620 exhibits a support nut 627 and a screw threat 626 that can be secured on a structure of a power station or else by means of a counter nut (not shown here). On one side panel of the cylinder 629a, the cable 10 is attached and passed through to the internal first chamber 42, in which the outer shelf 41 of the cable 10 is removed. The internal cable parts are guided to ports 621624, which pass the individual parts of the cable 10 through the second side panel 629b. In this application example, a data port 621, a port for cooling fluid 622, a port for each of the two conductors 623, a port for the supporting cord 624 and an additional port 44 can be found. However, depending on the individual application and cable built-up, alternative arrangements and different kinds of ports are possible. The port for the cooling fluid 622 is connected to the tube 20 of the cable 10 on the internal side of the flange section 620. On the outer side, the port for the cooling fluid 622 is connected to a tube 20c which is further connected to a fluidic pump as indicted by the dashed arrow 70. From the pump a tube 20d reconnects the fluidic path from the pump back to the adapter charger 60 to the contact section 610, as indicated by the second dashed arrow 71. The tube 20d guides the cooling fluid 21 to a fluid divider 29 where the tube splits again in two tubes 20a, 20b which further lead to a first ports 613a,b of the contact section 620, as it can be seen in FIG. 20. The conductors 12a, 12b, together with the cable hoses 11a, 11b and the cooling fluid 21 accommodated in the first interstitial space 15a,15b in-between are guided through the ports 623a, 623b of the flange section 620 and are each further connected to a second port 614a,b of the contact section 610.

A section view of the contact section 610 is illustrated in FIG. 23. From the top left hand side of the figure, the cooling fluid 21 is delivered from the pump through the tube 20d, as indicated by the dashed line. The tube 20a is attached to a first port 613a, from where the cooling fluid 21 enters a second chamber 612a surrounding a contact member 611a of the contact section 610. The contact member 611a electrically connects to a connecting pin 616a which is meant to be attached to the power source of the overall system (not shown here). The cooling fluid 21 leaves the second chamber 612a through the first interstitial space 15a between the conductor 12a and the cable hose 11a. The assembly of the connected parts, charger, cable and connector, are depicted schematically in FIG. 24.

Hence the full cooling circle starts at a pump (not shown here), is guided through the tube 20c to the port 622 of flange section 620 from where it enters the tube 20 of the cable 10. After travelling through the cable 10 to the connector 30 the cooling fluid stream is slit at the fluid divider 29 of the connector 30 in the tubes 20a, 20b to cool the two contact members 31a, 31b. From here the cooling fluid 21 is guided back to the adapter charger 60 in the first interstitial spaces 15a, 15b through the cable 10. At the contact section 610 the cooling fluid 21 cools the contact members 611a,b and is being led back in the following to the pump via the tubes 20a, 20b, the second fluid divider 29 and tube 20d. This direction of the cooling circle is advantageous since the plug contact of the connector 30 has a higher electrical resistance and hence more heat development than it is the case for the permanent connection through the connecting pins 616a,b of the adapter charger 60.

Additionally to the variation as shown in FIG. 17-24, the cable assembly 1 can be expanded by a security system for cable leakage. Therefore, the cable 10 being surrounded by the second sheath 41 and forming the second interstitial space 16 in-between the individual cable parts and the outer sheath 41 can be additionally impinged with a pressurized control fluid 40 by an external device which can increase the pressure of the control fluid 40 such as e.g. a compressor or other means (not shown here). The pressurized control fluid 40 is fed in the cable assembly 1 through the port 44 on the flange section 620 of the adapter charger 60. From here, the pressurized control fluid 40 first enters the first chamber 42 of the adapter charger 60 and propagates through the second interstitial space 16 of the cable 10 until it reaches the connector 30. Here it fills out a second chamber 43 with the pressurized control fluid 40. The external device which controls the pressure of the control fluid impinges these spaces with a predetermined pressure. All parts and hollow sections in which the pressurized fluid is kept are made fluid-tight to ensure a preferably constant pressure level so that the external device which controls the pressure of the control fluid 40 does not have to operate continuously. However, if the pressure level falls under a first limit, a detecting means (45) detects the pressure loss and activates the external device which controls the pressure of the control fluid to maintain a target value of the pressure. If the cable is damaged, the pressure level falls under a second limit that is lower than the first limit and the system is able to identify the leakage and can deactivate the cable assembly 1 for security reasons.

Figure 25:
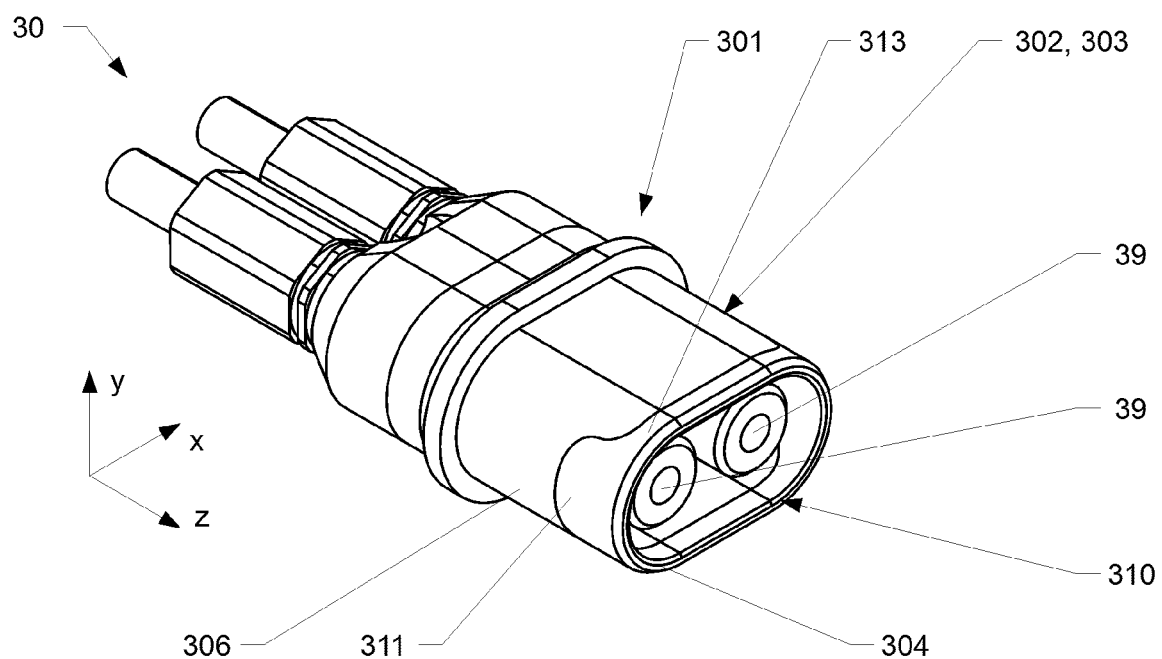
FIG. 25 schematically shows a connector with an impact absorbing means according to the invention.
Figure 26:
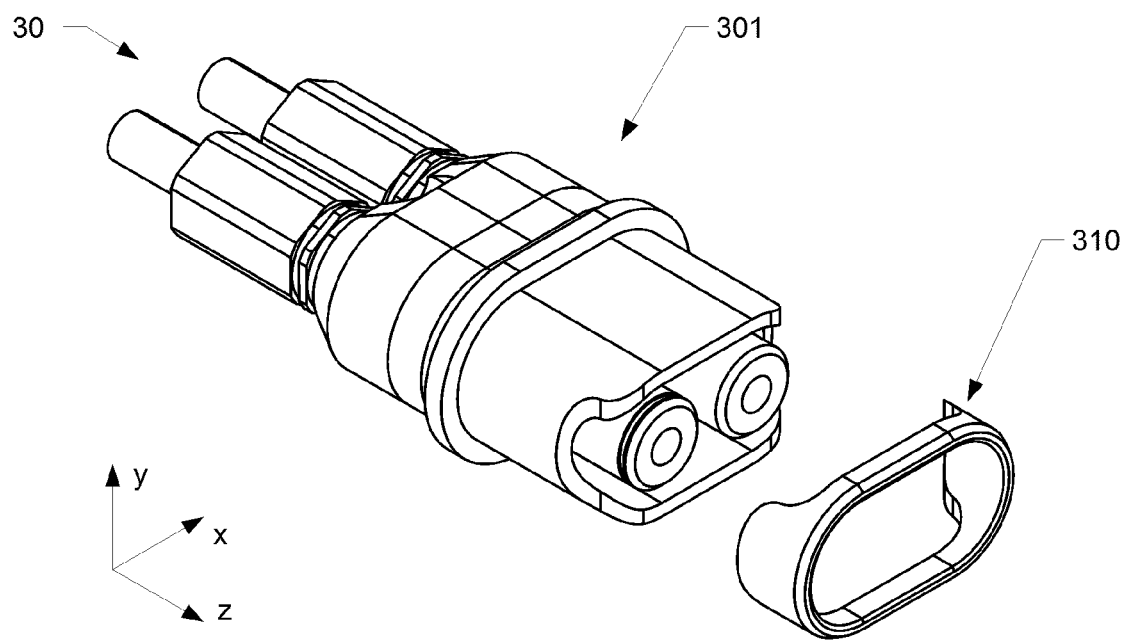
FIG. 26 schematically shows the connector of FIG. 25, the impact absorbing means being disconnected from the rest of the connector housing for illustrative purposes.

FIG. 25 and FIG. 26 show a first connector 30 with an impact absorbing means 310 according to the invention. The connector 30 comprises a connector housing 301 which has a mechanical guard 302 that partially surrounds two electrical connecting pins 39 of the connector 30. The mechanical guard 302 is essentially embodied as a collar 303. As shown, the impact absorbing means is arranged at a ridge region 304 of the collar 303, which typically will impact on the ground when being dropped and/or will get in contact with e.g. a coat of varnish of a vehicle. The impact absorbing means 310 as shown is made from a rubber-like material which is feasible to absorb mechanical impulses and at least partially convert them into thermal energy, as well as to distribute induced mechanical stress. An outer/peripheral face of the impact absorbing means 310 form a sealing means 313 that is arranged to be arranged to interact with a corresponding mating connector (not shown) such that when in a coupled state with the corresponding mating connector an essentially fluid tight interconnection between the at least one sealing means 313 and the corresponding mating connector is established. As shown, the impact absorbing means 310 comprises an augmentation 311 that is arranged at a bend 306b of the collar 303 in order to increase damage protection. As indicated in FIG. 26, the impact absorbing means 310 of the embodiment of a connector 30 shown is interconnected with the connector housing 301 by means of an adhesive connection, respectively by a glue.

Figure 27:
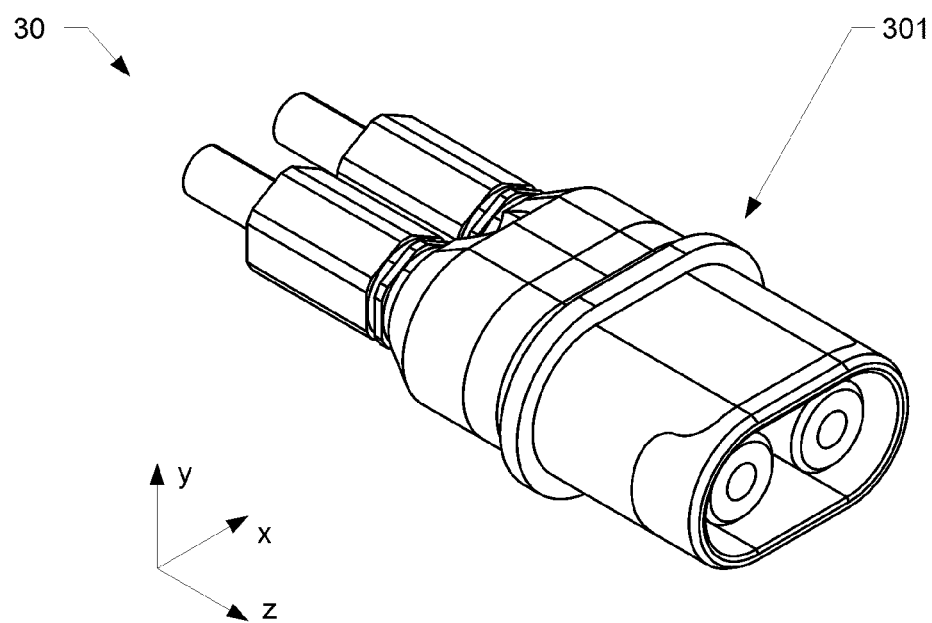
FIG. 27 schematically shows another connector with an impact absorbing means according to the invention.
Figure 28:
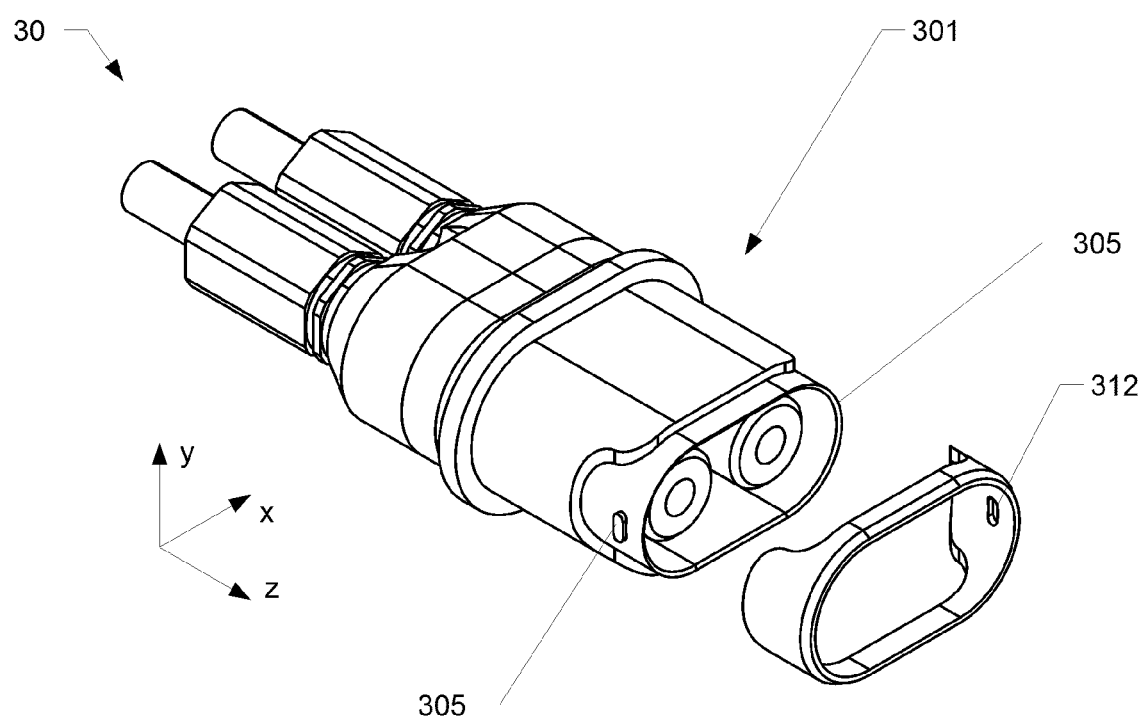
FIG. 28 schematically shows the connector of FIG. 27, the impact absorbing means being disconnected from the rest of the connector housing for illustrative purposes.

FIG. 27 and FIG. 28 show another embodiment of a connector 30 where the impact absorbing means 310 is interconnected with the connector housing 301 by means of a mechanical connection, in particular by form locking. Therefore the impact absorbing means 310 comprises openings 312 arranged receive protrusions 305 arranged at the connector housing 301 (in FIG. 28 only one of the openings 312 and one of the protrusions 305 is visible). Such an embodiment of a connector 30 according to the invention may be advantageously be produced using two-component injection molding.

Figure 29:
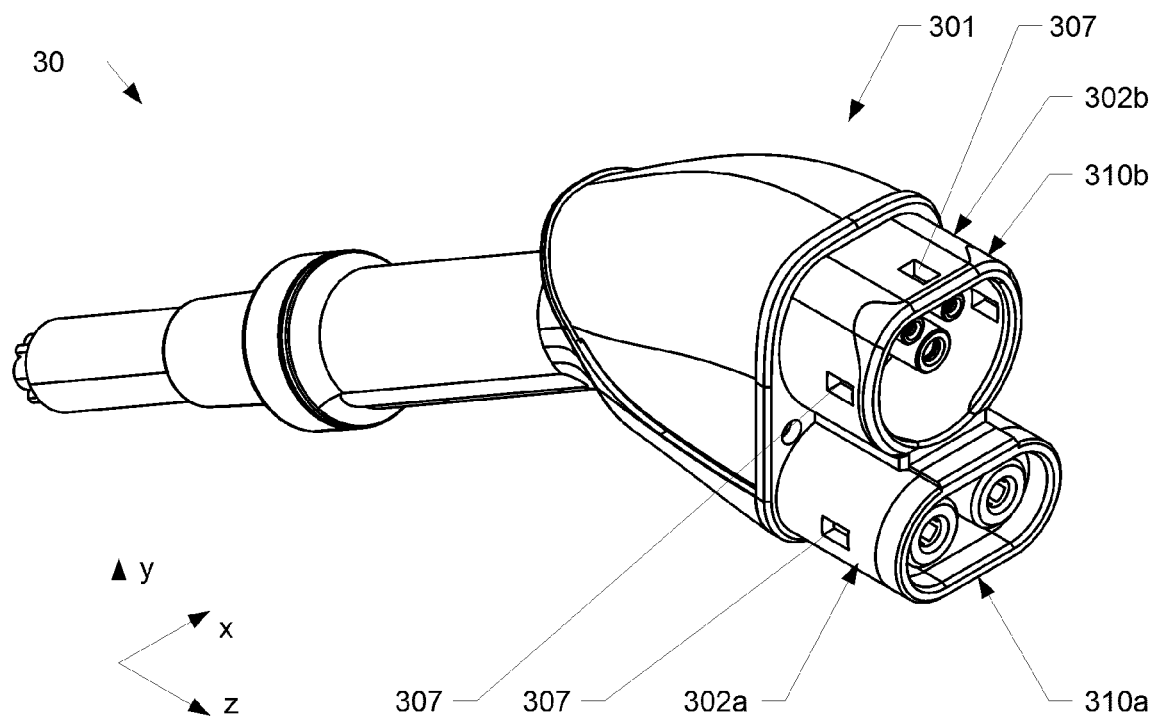
FIG. 29 schematically shows yet another connector with an impact absorbing means according to the invention.
Figure 30:
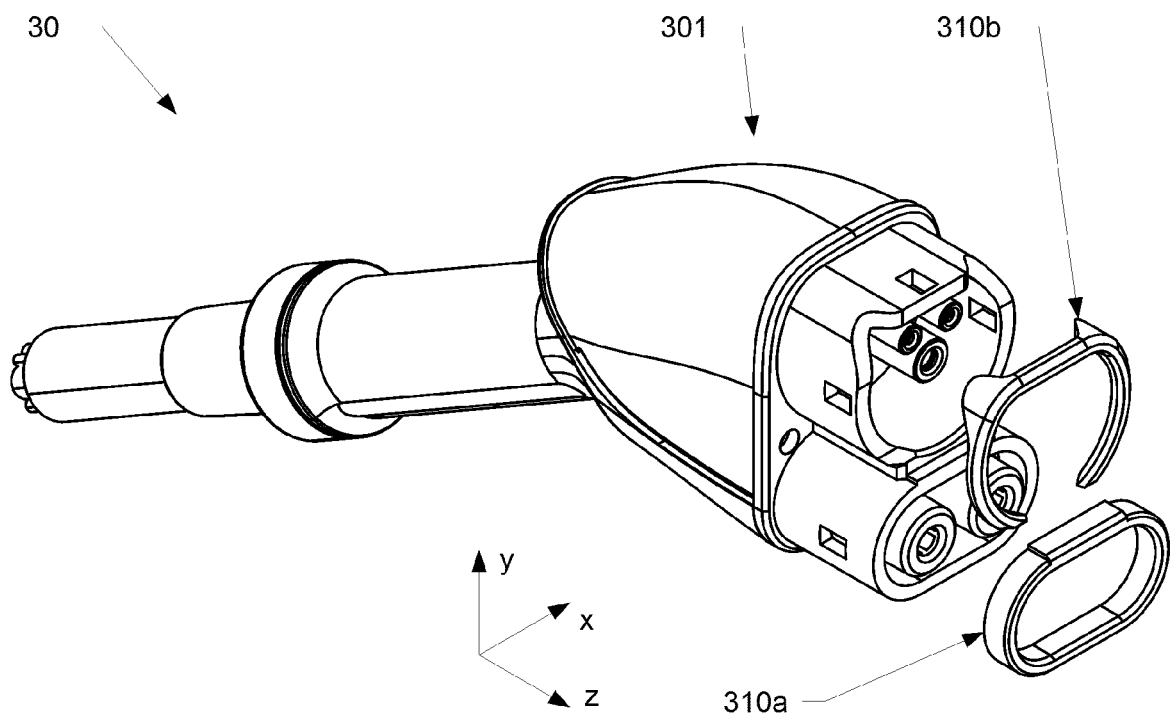
FIG. 30 schematically shows the connector of FIG. 29, the impact absorbing means being disconnected from the rest of the connector housing for illustrative purposes.

FIG. 29 and FIG. 30 show another embodiment of a connector 30 comprising two impact absorbing means 310a-b that are arranged at two mechanical guards 302a-b, respectively the ridge regions 304 of two collars 303a-b. As indicated, both impact absorbing means are shaped such that they provide sufficient mechanical protection but do not interfere with locking means 307 of the connector 30. Thus functionality of the connector 30 provided impact absorbing means according to the invention is not affected. This is important in order to comply with certain industrial standards for connectors.

REFERENCE NUMERALS

| | | | |
|---|---|---|---|
| 1 | Cable assembly | 310, 310a-b | Impact absorbing means |
| 2 | Bundle | 311 | Augmentation |
| 10, 10a-b | Cable | 312 | Opening |
| 11, 11a-b | Cable hose | 313 | Sealing element |
| 12, 12a-f | Conductor | 320 | Interconnecting arrangement |
| 13 | First sheath | 31, 31a-b | Contact member (connector) |
| 15, 15a-b | First interstitial space | 32 | First chamber |
| 16 | Second interstitial space | 33 | First port |
| 17 | Grounding cable assembly | 34, 34a-b | Second port |
| 18 | Supporting cord | 35 | Channel |
| 20, 20a-b | Tube | 36 | Data port |
| 21 | Cooling fluid | 37 | Closure |
| 25, 25a-f | Spacer | 38 | Sealing |
| 26 | First insulating tube | 39 | Connecting pins |
| 27 | Second insulating tube | 391a-b | Fast DC charging pin |
| 28a-b | Concentric layer of conductors | 392 | Grounding pin |
| 29 | Fluid divider | 393a-b | AC charging pin |
| 30 | Connector | 40 | Pressurized control fluid |
| 301 | Connector housing | 41 | Second sheath |
| 302, 302a-b | Mechanical guard | 42 | First camber for control fluid |
| 303, 303a-b | Collar | 43 | Second chamber for control fluid |
| 304 | Ridge region | 44 | Port (for pressurized fluid) |
| 305 | Protrusion | 45 | Detecting means |
| 306a-b | Corner/bend | 50 | Thermal sensor |
| 307 | Locking means | 51 | Auxiliary tube |
| 52 | Auxiliary fluid | 621 | Data port |
| 53 | Signal conductor | 622 | Port for cooling fluid |
| 54 | Data cable | 623 | Port for conductors |
| 60 | Adapter charger | 624 | Port for cord |
| 610 | Contact section | 625 | Port for grounding cable |
| 611 | Contact member (charger) | 626 | Screw thread |
| 612 | Second chamber (charger) | 627 | Support nut |
| 613 | First port (charger) | 70 | Fluidic path to pump |
| 614 | Second port (charger) | 71 | Fluidic path from pump |
| 615 | Channel (charger) | | |
| 616 | Connecting pin (charger) | | |
| 617 | Sealing (charger) | | |
| 620 | Flange section | | |

What is claimed is:

1. A cable assembly, comprising
a. a cable with a cable hose and at least one conductor arranged therein, wherein the cable hose is spaced a distance apart from the conductor forming a first interstitial space between the at least conductor and the cable hose;
b. at least one tube for conveying of a cooling fluid; and
c. a connector comprising at least one contact member, a connector housing, and a chamber,
wherein the at least one contact member is interconnected to the at least one conductor,
wherein said connector housing has at least one impact absorbing means arranged at an outer face of the connector housing, and
wherein said chamber comprises
 i. a first port which is interconnected to the first interstitial space between the at least one conductor and the cable hose and
 ii. a second port which is interconnected to the tube.

2. The cable assembly according to claim 1, wherein the at least one tube for conveying of the cooling fluid is arranged inside of the cable hose.

3. The cable assembly according to claim 1, wherein the at least one tube for conveying the cooling fluid is arranged outside of the cable hose.

4. The cable assembly according to claim 1, wherein a spacer is arranged in the first interstitial space.

5. The cable assembly according to claim 1, wherein at least one tube to convey a cooling fluid is arranged in the center region of the cable hose and at least two conductors are arranged radially around the at least one tube between the at least one tube and the cable hose.

6. The cable assembly according to claim 1, wherein the at least one conductor has a first sheath.

7. The cable assembly according to claim 1, wherein the at least one contact member comprises a channel for cooling of the contact member, wherein the channel is interconnected to the first interstitial space and/or to tube to convey cooling fluid.

8. The cable assembly according to claim 1, wherein the cable assembly comprises an adapter charger for the interconnection of the at least one conductor to at least one contact member which is further interconnected to an outer power source and the at least one first interstitial space and/or tube conveying the cooling fluid fluid-tight to an external fluid machinery.

9. The cable assembly according to claim 8, wherein the adapter charger comprises a second chamber with a first port which is interconnected to the tube and a second port which is interconnected to the first interstitial space of the cable.

10. The cable assembly according to claim 1, wherein the cable assembly is surrounded by a second sheath forming a second interstitial space between the at least one cable hose of the conductor and the second sheath.

11. The cable assembly according to claim 10, wherein the second interstitial space receives a pressurized control fluid.

12. The connector according to claim 1, wherein the connector comprises at least one mechanical guard that at least partially surrounds an electric and/or fluidic contact to be interconnected with a mating corresponding connector, and wherein the at least one impact absorbing means is arranged at the mechanical guard.

13. The connector according to claim 12, wherein the mechanical guard comprises a collar and the at least one impact absorbing means is arranged at a ridge region of the collar.

14. The connector according to claim 1, wherein the at least one impact absorbing means comprises an augmentation arranged at a corner and/or at a bend of the connector housing to distribute an impact load induced in the at least one impact absorbing means.

15. The connector according to claim 1, wherein the connector housing is mainly made from a first material and the at least one impact absorbing means is mainly made from a second material, whereby the elastic modulus of the first material is higher than the elastic modulus of the second material.

16. The connector according to claim 15, wherein the at least one impact absorbing means is at least partially made from a material chosen from the group consisting of rubber, silicone, polyurethane.

17. The connector according to claim 16, wherein the at least one impact absorbing means is interconnected with the connector housing by means of a two-component injection molding process.

18. The connector according to claim 1, wherein the at least one impact absorbing means is interconnected with the connector housing by means of a chemical connection, in particular by means of an adhesive connection and/or by a welding connection.

19. The connector according to claim 1, wherein the at least one impact absorbing means is interconnected with the connector housing by means of mechanical connection, in particular by a clamping connection and/or by a snap connection and/or by a frictional connection.

20. A cable for a cable assembly, the cable comprising:
a. a cable with a cable hose and at least one conductor arranged therein, wherein the cable hose is spaced a distance apart from the conductor forming a first interstitial space between the at least one conductor and the cable hose; and
b. at least one tube for conveying of a cooling fluid,
wherein the at least one conductor is interconnected to at least one contact member in a connector having a connector housing and a chamber,
wherein the connector housing of the connector has at least one impact absorbing means arranged at an outer face of the connector housing, and
wherein said chamber of the connector comprises
i. a first port which is interconnected to the first interstitial space between the at least one conductor and the cable hose, and
ii. a second port which is interconnected to the tube.

21. A connector for a cable assembly, the connector comprising:
at least one contact member, a connector housing, and a chamber,
wherein the at least one contact member is interconnected to at least one conductor in a cable having a hose,
wherein said connector housing has at least one impact absorbing means arranged at an outer face of the connector housing, and
wherein said chamber comprises
i. a first port which is interconnected to a first interstitial space between the at least one conductor and the hose, and
ii. a second port which is interconnected to at least one tube for conveying of a cooling fluid.

\* \* \* \* \*